United States Patent
Fenocchi et al.

(10) Patent No.: US 12,031,415 B2
(45) Date of Patent: Jul. 9, 2024

(54) DRILLING FLUID THROUGH-FLOW AXIAL FLUX TURBINE GENERATOR

(71) Applicant: MS Directional, LLC, Conroe, TX (US)

(72) Inventors: Arnold Fenocchi, London (GB); Nobuyoshi Niina, Yokohama (JP); Libo Yang, Katy, TX (US)

(73) Assignee: MS DIRECTIONAL, LLC, Conroe, TX (US)

( * ) Notice: Subject to any disclaimer, the term of this patent is extended or adjusted under 35 U.S.C. 154(b) by 0 days.

(21) Appl. No.: 18/163,745

(22) Filed: Feb. 2, 2023

(65) Prior Publication Data

US 2023/0243241 A1    Aug. 3, 2023

Related U.S. Application Data

(60) Provisional application No. 63/306,336, filed on Feb. 3, 2022.

(51) Int. Cl.
*E21B 41/00* (2006.01)

(52) U.S. Cl.
CPC .............................. *E21B 41/0085* (2013.01)

(58) Field of Classification Search
CPC .......... E21B 41/0085; F05B 2220/7066; F05B 2220/7068; F03B 13/02; H02K 1/2795; H02K 3/28; H02K 7/1823; H02K 21/24
See application file for complete search history.

(56) References Cited

U.S. PATENT DOCUMENTS

| | | | |
|---|---|---|---|
| 7,084,548 B1* | 8/2006 | Gabrys | H02K 3/47 |
| | | | 310/156.08 |
| 2014/0210284 A1* | 7/2014 | Banba | H02K 1/185 |
| | | | 310/43 |
| 2019/0285073 A1* | 9/2019 | Lee | H02K 7/1823 |

* cited by examiner

*Primary Examiner* — Julio C. Gonzalez
(74) *Attorney, Agent, or Firm* — Jackson Walker LLP

(57) ABSTRACT

The invention provides a generator suited for drilling equipment, such as oil and gas applications. A turbine can drive the permanent-magnet, synchronous generator. The generator uses axial flux topology for a stator and a rotor. The design permits a wide airgap between the stator and rotor, so fluid and debris from drilling operations can flow through the generator relatively unobstructed, and the fluid flow can provide a power source to rotate the turbine coupled to the rotor to generate electrical power. The airgap can accommodate non-magnetic sealing plates to provide additional protection to the generator components. The rotor includes a Halbach magnet array of permanent magnets, producing high-intensity magnetic flux in an axial direction. The Halbach magnet array avoids any necessity for the conventional rotor back-iron to return the flux. The proposed generator is intended to generate electric power for drilling equipment, permitting the elimination of costly batteries.

16 Claims, 24 Drawing Sheets
(12 of 24 Drawing Sheet(s) Filed in Color)

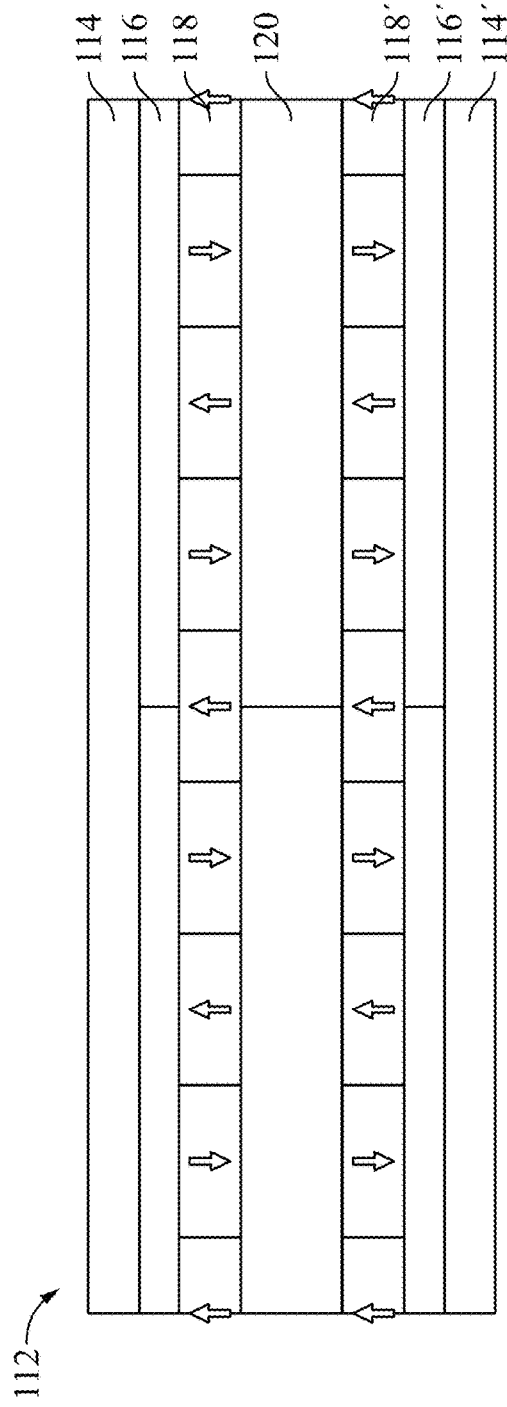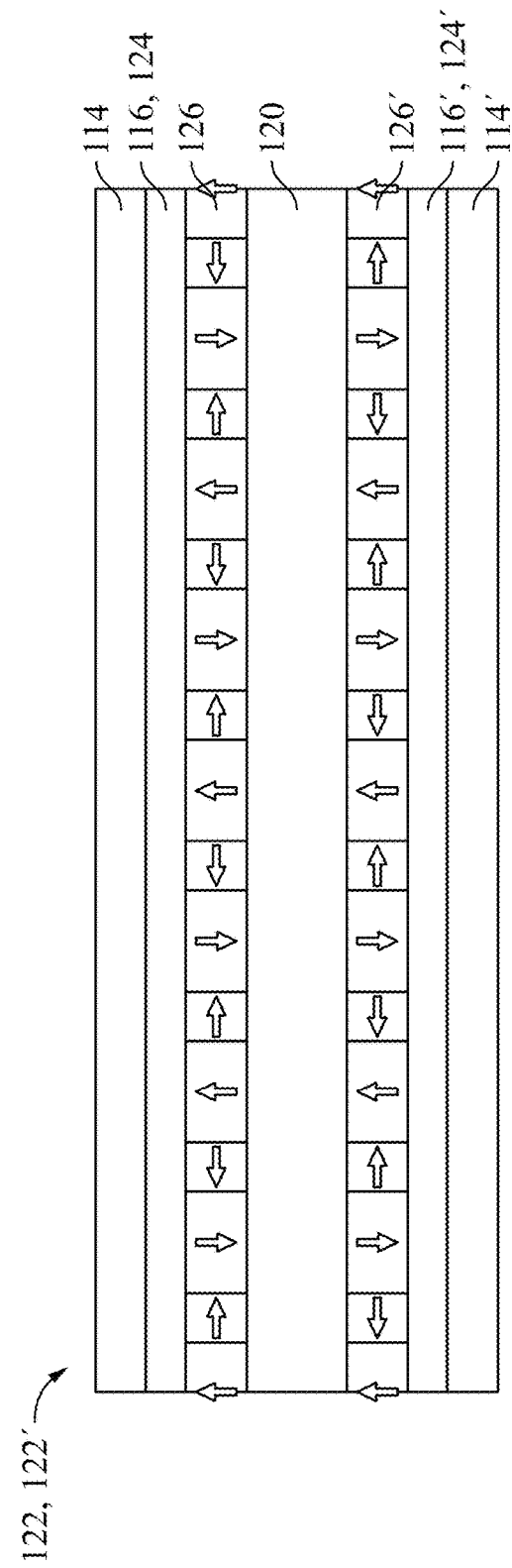

DRILLING FLUID THROUGH-FLOW AXIAL FLUX TURBINE GENERATOR

CROSS REFERENCE TO RELATED APPLICATIONS

The application claims the benefit of U.S. Provisional Application Ser. No. 63/306,336, entitled "Axial Flux Generator", filed Feb. 3, 2022, which is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to an oilfield subsurface axial flow generator. More specifically, the disclosure relates power generation or usage with an axial flow generator in a subsurface location of a well that allows drilling fluid and other fluids to flow therethrough.

Description of the Related Art

In certain environments, location specific power is needed to operate instruments, tools, transmitters and other equipment. In many of those environments, space is a premium and compact power is mandatory. Oil field downhole operations provide one example. Drilling an oilfield well proceeds through strata tens of thousands of feet often starting with basketball size diameter tubing progressing down to tennis ball size diameter tubing as a well depth increases. Power is needed often downhole in the well at the deepest levels. The industry is challenged to support power at those depths and often rely on battery power that must be pulled out of the well for replacement or recharging.

An alternative is to generate the power downhole but the available size of the tubing restricts options. A typical power generator used in a variety of industries from residential to industrial is known as a radial flux generator. The radial flux generator includes an outer stator with an inner rotor positioned within an inner diameter cavity of the stator. The inner rotor rotates inside the outer stator using magnetic field currents to generate power from the rotation. The flux from magnets is radially formed in such typical generators between the larger diameter outer stator and the smaller diameter inner rotor rotating within the outer stator. However, for downhole applications, typical radial power generators sized for the available space in the small diameter tubing are challenged to meet new demands on power usage with increased complexity of downhole instrumentation.

FIG. 1A is a schematic perspective view of a standard axial flux motor with a single rotor for an axial flux generator. FIG. 1B is an assembly schematic view of a standard axial flux motor with a single rotor for an axial flux generator. In contrast to the more common radial flux generator, an axial flux generator 2 has a rotor 4 generally positioned longitudinally relative to a stator 12, rather than inside the stator as in a radial flux generator. The rotor rotates relative to the stator, but rotates from a different axial position that the stator on a longitudinal axis 20 of the assembly. Because the components can be positioned longitudinally rather than radially, an axial flux generator can provide higher power than a radial flux generator for the same diametric size, or the same power for a more compact diametrical size. A small gap 22 is formed between the rotor and the stator. The rotor 4 is formed with a rotor core 6 to support a magnet array 7 having magnets 8 with a north pole facing an axial direction alternatingly interspersed with magnets 10 with a south pole facing the same axial direction. The rotor core is made of a magnetic material, such as iron, steel, or soft magnetic powder formed into shape by powder sintering metallurgy, and hence is sometimes referred to as a "back-iron". Such a rotor core is generally of ferromagnetic material with high magnetic permeability. The magnetic capability of a back-iron is critical on a standard axial motor to return a magnetic field between the north facing magnet and the south facing magnet to complete a magnet circuit through the magnetic rotor core. The stator 12 is formed with a stator core 14 and stator teeth 16 extending from the core. The stator core and stator teeth are also formed with magnetic material for the same reason as the rotor core. Slots between the teeth 16 provide openings for windings 18 to be placed. The windings 18 can be formed around bobbins (not shown). The bobbins are assembles onto a stator core, but oriented at 90 degrees to standard alignment of a radial flux stator core. To generate the electrical power, a magnetic flux is formed with the magnets, rotor core, and stator core when the rotor is rotated relative to the stator. The windings 18 adjacent the gap respond to the magnetic field generated through the magnets to produce the electrical energy. A design that has a wide airgap diminishes the magnetic flux lines and reduces the electrical power output.

FIG. 2A is a schematic perspective view of a standard axial flux motor with multiple rotors for an axial flux generator. FIG. 2B is an assembly schematic view of a standard axial flux motor with multiple rotors for an axial flux generator. An alternative standard axial flux motor 2 can include multiple rotors 4A and 4B having rotors cores 6A and 6B with magnet arrays 7A and 7B, respectively. The rotors can be disposed longitudinally relative to a common stator 12 having a core 14 with extending stator teeth 16A and 16B toward each rotor, respectively. Windings 18 can be disposed adjacent both rotors. In some embodiments, the windings can be formed on bobbins, such as shown in FIG. 1B, oriented at 90 degrees to a standard alignment of a radial flux stator core, so that the two rotors 4A and 4B face each, not as North-South, but as North-North and South-South. The rotors and stator are likewise made of magnetic material. Similarly to the single rotor example, the multiple rotor example creates a magnetic flux path the magnet array on each rotor, through the respectively rotor cores, and through the respective teeth, and through the common stator core. The magnetic flux through a gap between each rotor and the respective portion of the stator generates electric power through the coils while rotating.

Some efforts have been made to apply an axial flux generator to oil field downhole applications. One such effort is found in U.S. Pat. No. 9,863,238. The Abstract states, "A submersible electrical machine includes a first magnetic package spaced axially from a second magnetic package, a first stator displaced axially from the first magnetic package by a first air gap, a second stator displaced axially from the second magnetic package by a second air gap. The electrical machine can be operated as a generator or as a motor. When operating as a generator, a turbine can rotate the magnetic packages relative to the stators in response to fluid flowing axially across the electrical machine." The patent demonstrates two rotors and two stator assemblies that appears to require magnetically-permeable rotor cores ("back-iron") to return the magnetic flux, among other features.

A further challenge for downhole applications is that typically the generator needs to be sealed from the wellbore drilling fluids (typically termed "drilling mud" or just "mud") in the well that pass by the generator to avoid electrical shorts. Drilling mud has a higher viscosity than water and it allows cuttings to travel easier to the surface. Drilling mud is made up of water and special chemicals are added to increase its viscosity, density, and to prevent formation damage. Common minerals added to mud are bentonite, gypsum, and barite. Some generators are sealed as a total unit to avoid contact with the mud. Other generators, as shown in the above U.S. Pat. No. 9,863,238, seal around the rotor and stator but do not allow the mud to flow through the generator. Further, in another implementation, the seals perform an important function of retaining lubricating fluid inside the generator for cooling the generator. However, the seals can wear and fail, leading to leakage of the internal cooling fluid out of the generator and leakage of the mud into the generator, causing shorting and failure. The expense of pulling the generator miles uphole to the surface for repair or replacement can be substantial.

There is a further issue besides shorting in allowing mud into the generator. While the mud theoretically could be used to lubricate and cool the motor if the mud did not short the electrical components, mud contains debris from the drilling operations. The debris in the mud can lodge in the small spaces of the gap between the rotor and the stator. The debris that lodges in the gap can lock up the rotor from rotating causing a failure of the motor and thus the generator. A wider airgap reduces the energy provided to operate the downhole equipment and can in turn result in failure of the downhole system.

A mud lubricated and cooled, axial flux generator with a wider gap is needed.

BRIEF SUMMARY OF THE INVENTION

The invention provides a permanent-magnet, synchronous, generator particularly suited for downhole equipment in oil and gas applications. The generator uses axial flux topology for the stator and a rotor. A turbine coupled to the rotor is used to turn the rotor when fluid in an annulus around the generator, such as drilling mud, formation fluid, and other fluids, flows by and through the turbine and other portions of the generator. The generator design permits a wider airgap between the stator and rotor than traditionally has been able to provide, so mud with its debris from downhole operations can flow through the generator relatively unobstructed, and the mud flow can provide a power source to rotate a turbine coupled to the rotor to generate the electricity while also lubricating and cooling the generator. Normally, a wider airgap detrimentally reduces the generator power production below acceptable levels for use in downhole equipment. However, the generator design allows a wider separation than known axial flux generators, which have small gaps that do not allow mud with debris to pass typically without clogging. Yet, the generator design is still able to produce comparable power to known generators, even with the wider airgap. The gap can also accommodate a thickness of sealing plates to provide additional protection to the generator parts. The rotor includes a Halbach magnet array of permanent magnets for producing magnetic flux in the axial direction. The Halbach magnet array can avoid any necessity for an expensive conventional rotor back-iron to return the flux, saving cost and complexity. The typical requirement for downhole equipment is over 50 watts, and modeling analysis of the design indicates that over three times that amount can be generated in a three-phase configuration within the proposed operating speed-range of 2,000-5,000 RPM for a typical size of machine.

The disclosure provides an axial flux generator having a longitudinal axis of rotation for components of the generator, comprising: a housing forming an interior volume; a chassis configured to support the components in the interior volume with a longitudinal shaft aligned with the longitudinal axis and disposed at least partially in the interior volume; and an axial flux motor coupled to the longitudinal shaft of the chassis. The axial flux motor comprises an axial flux stator having a stator core with metallic windings coupled to the stator core; and an axial flux rotor coupled to the longitudinal shaft and at least partially spaced longitudinally from the axial flux stator, the axial flux rotor being configured to rotate around the longitudinal axis relative to the axial flux stator. The axial flux rotor having a magnet array comprises: a plurality of axial magnets having alternating North and South poles that are coupled in a circumferential array around the longitudinal axis, wherein magnetic fields generated between the North and South poles of the axial magnets are in a direction parallel with the longitudinal axis; and a plurality of circumferential magnets having North and South poles circumferentially located between the axial magnets in the circumferential array, wherein magnetic fields generated between the North and South poles of the circumferential magnets are in a direction circumferentially around the longitudinal axis. The magnet array of the axial flux rotor is longitudinally spaced by an airgap from the metallic windings of the axial flux stator, and a resulting magnetic flux from the magnet array being focused axially towards the metallic windings, and the interior volume between the housing and the chassis coupled with the axial flux motor forming an annulus, the annulus configured to allow fluids with debris to flow through the annulus and flow at least partially through the airgap between the axial flux stator and the axial flux rotor.

The disclosure also providers a method of creating electrical energy at a subsurface location for subsurface equipment in a wellbore, comprising: placing the axial flux generator of claim 1 at a location in the wellbore below a ground surface; circulating drilling fluids in the wellbore through the annulus to rotate the axial flux rotor relative to the axial flux stator; generating a rotating magnetic flux in the axial flux rotor extending into the axial flux stator; generating electrical energy; and providing the electrical energy to the downhole equipment.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 12A is a two-dimensional diagram of a magnet array of a model of a standard axial flux motor with a standard magnet array with two rotors having magnetic support plates, such as in FIG. 2B.

FIG. 12B is a two-dimensional diagram of a magnet array of a model of an illustrative high output axial flux motor of the invention with a Halbach magnet array with two rotors having either magnetic or non-magnetic support plates, such as in FIG. 4.

FIG. 12C' is an enlarged portion of the two-dimensional flux density plot of FIG. 12C.

FIG. 12D' is an enlarged portion of the two-dimensional flux density plot of FIG. 12D.

FIG. 12E' is an enlarged portion of the two-dimensional flux density plot of FIG. 12E.

DETAILED DESCRIPTION

Figure 1A:
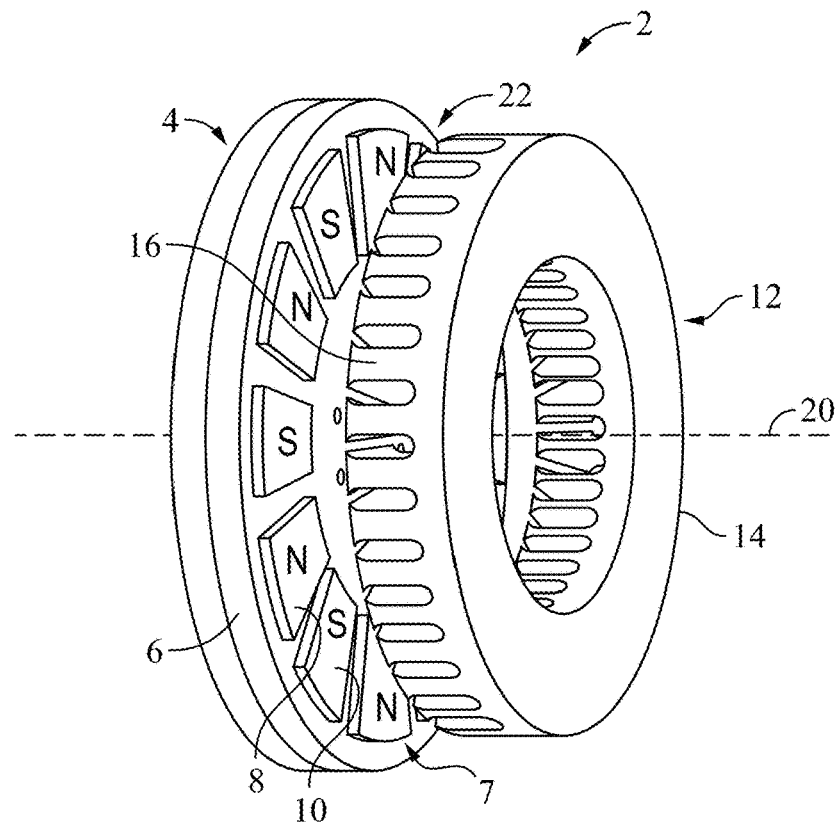
FIG. 1A is a schematic perspective view of a standard axial flux motor with a single rotor for an axial flux generator.

The Figures described above and the written description of specific structures and functions below are not presented to limit the scope of what Applicant has invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms "top", "up", "upper", "upward", "bottom", "down", "lower", "downward", and like directional terms are used to indicate the direction relative to the figures and their illustrated orientation and are not absolute relative to a fixed datum such as the earth in commercial use. The term "inner," "inward," "internal" or like terms refers to a direction facing toward a center portion of an assembly or component, such as longitudinal centerline of the assembly or component, and the term "outer," "outward," "external" or like terms refers to a direction facing away from the center portion of an assembly or component. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unitary fashion. The coupling may occur in any direction, including rotationally. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Some elements are nominated by a device name for simplicity and would be understood to include a system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein. As such, the use of the term "exemplary" is the adjective form of the noun "example" and likewise refers to an illustrative structure, and not necessarily a preferred embodiment. Element numbers with suffix letters, such as "A", "B", and so forth, are to designate different elements within a group of like elements having a similar structure or function, and corresponding element numbers without the letters are to generally refer to one or more of the like elements. Any element numbers in the claims that correspond to elements disclosed in the application are illustrative and not exclusive, as several embodiments may be disclosed that use various element numbers for like elements.

The invention provides a permanent-magnet, synchronous, generator particularly suited for downhole equipment in oil and gas applications. The generator uses axial flux topology for the stator and a rotor (also termed herein "axial flux stator" and axial flux rotor"). A turbine coupled to the rotor, directly or indirectly, can be used to turn the rotor when fluid in an annulus around the generator, such as drilling mud, formation fluids, or other fluids, flows by and through the turbine and other portions of the generator. Alternatively, a turbine can be coupled to the shaft that rotates the rotor. The generator design permits a wider airgap between the stator and rotor than traditionally has been able to provide, so mud with its debris from downhole operations can flow through the generator relatively unobstructed, and the mud flow can provide a power source to rotate a turbine coupled to the rotor to generate the electricity while also lubricating and cooling the generator. Normally, a wider airgap detrimentally reduces the generator power production below acceptable levels for use in downhole equipment. However, the generator design allows a wider separation than known axial flux generators, which have small gaps that do not allow mud with debris to pass typically without clogging. Yet, the generator design of the invention is still able to produce comparable power to known generators, even with the wider airgap. The gap can also accommodate a thickness of sealing plates to provide additional protection to the generator parts. The rotor includes a Halbach magnet array of permanent magnets for producing magnetic flux in the axial direction focused toward the stator windings. The Halbach magnet array can avoid any necessity for an expensive conventional rotor back-iron to return the flux, saving cost and complexity. The typical requirement for downhole equipment is over 50 watts, and modeling analysis of the design indicates that over three times that amount can be generated in a three-phase configuration within the proposed operating speed-range of 2,000-5,000 RPM for a typical size of machine.

The generator can be used as a motor in some applications. Electrical power provided to the stator can create the magnetic fields with the magnets to turn the rotor that can coupled to a longitudinal shaft to provide rotational power to equipment. Thus, the use of the term "generator" is used broadly herein and includes the generator functioning instead as a motor with appropriate structural and other modifications as is known to those in the field.

In at least one embodiment, key benefits include:
Provides sufficient power (~50 Watts) to replace batteries;
Only two main components of a stator and a rotor with no close tolerances of airgap required;
Easily dis-assembled for maintenance and cleaning;
Wider physical airgap between the stator and rotor, permitting mud to flow between the two components with reduced risk of clogging; and
Stator and rotor can be sealed with significantly thick sheets or plates of non-magnetic material (such as Inconel or 304 stainless steel) over their surfaces within the airgap with negligible deterioration of output.

Figure 3:
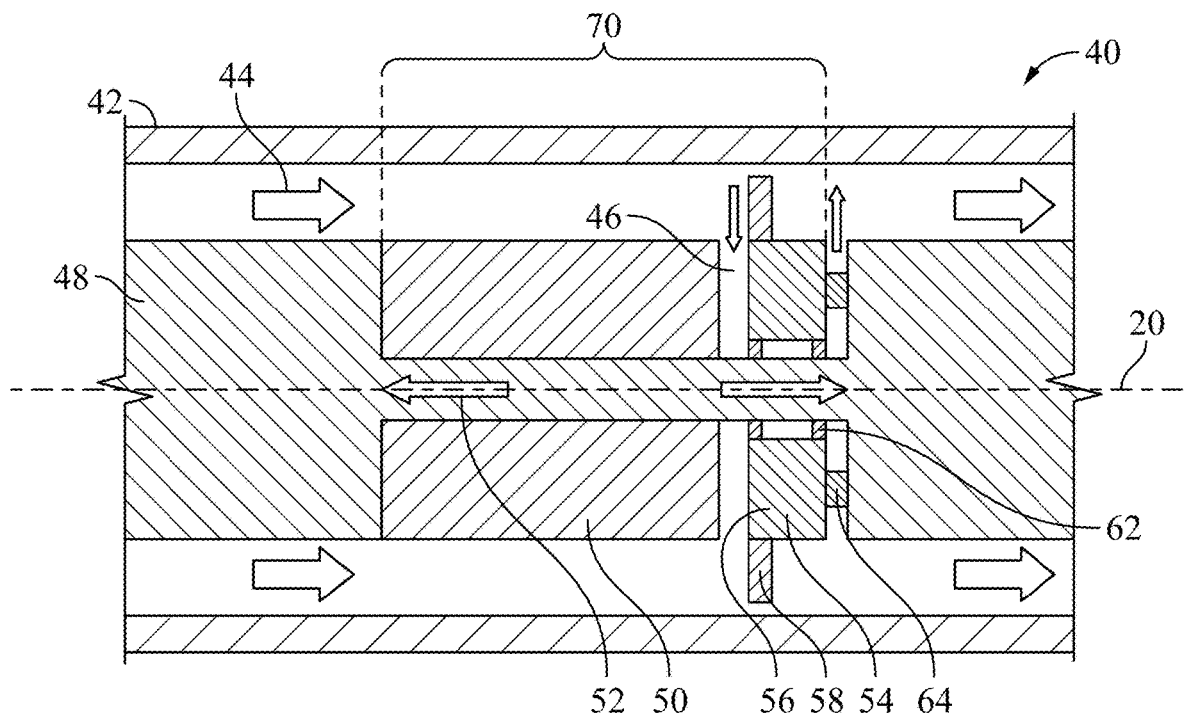
FIG. 3 is a schematic cross sectional view of an illustrated embodiment of an inventive mud flow-through, axial flux turbine generator with a single rotor.
Figure 4:
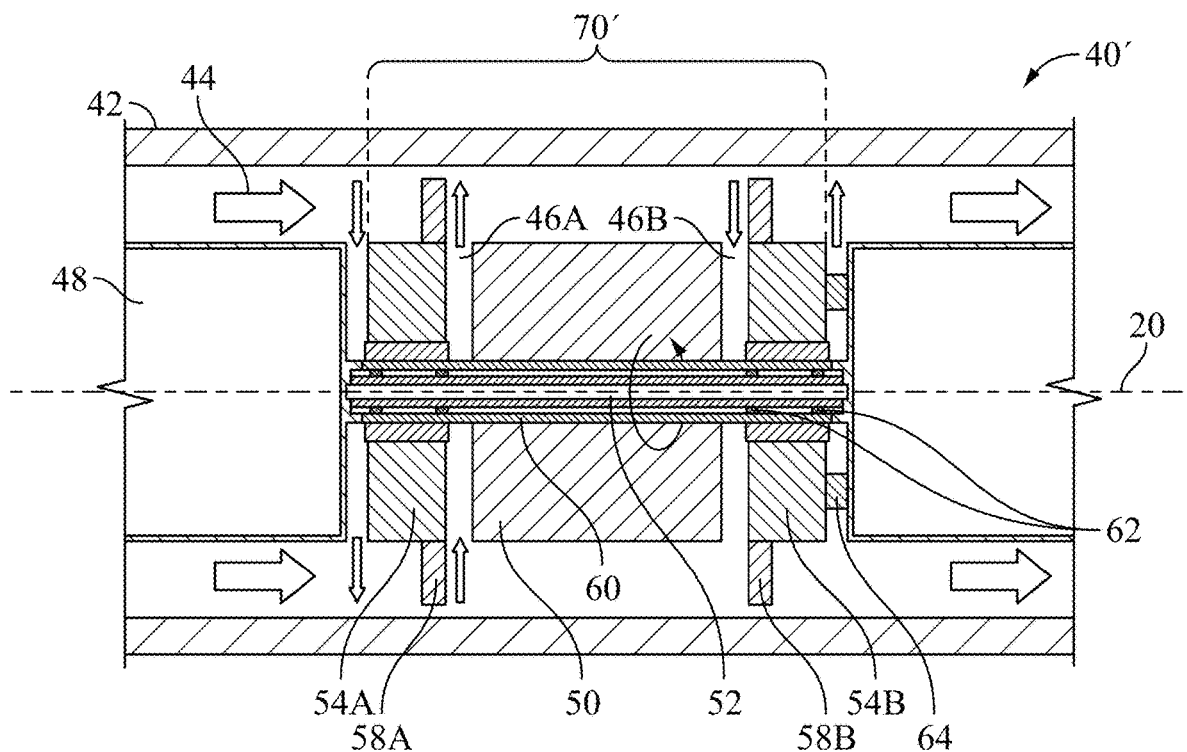
FIG. 4 is a schematic cross sectional view of another illustrated embodiment of an inventive mud flow-through, axial flux turbine generator with multiple rotors.

FIG. 3 is a schematic cross sectional view of an illustrated embodiment of an inventive mud flow-through, axial flux turbine generator with a single axial flux rotor. The generator 2 can be used in multiple applications, including as an example, generating electrical power for downhole equipment for oil and gas applications. The generator 2 can be a permanent-magnet, synchronous generator. A chassis 48 can structurally support the internal components around a longitudinal axis 20 of rotation for one or more components, including a high output, mud cooled axial flux motor 70 with its components. Other components coupled to the chassis can include wiring, switches, and electronic components. A housing 42 can be coupled around the chassis to form an annulus 44 with a sufficient annulus clearance for drilling mud to flow around the internal components of the generator and in flow paths through the motor 70. A channel 52 for wiring can be formed between ends of the chassis as shown. The axial flux motor 70 can include an axial flux stator 50 and an axial flux rotor 54 that can rotate around the longitudinal axis 20 relative to the stator. The stator 50 is generally fixedly coupled on a portion of the chassis 48 and the rotor 54 can be rotatably coupled to a portion of the chassis longitudinally at a different position than the stator. Radial bearings 62 can radially support the rotor around the chassis portion, and thrust bearings 64 between a downstream surface of the rotor and the chassis can support thrust loads on the rotor from the mud flow. The rotor 54 can include magnet array 56 of a Halbach design, as detailed below. A mud turbine 58 can be coupled to the rotor. Drilling mud pumped from the surface of the well can turn the mud turbine, and therefore the rotor coupled with the turbine around the longitudinal axis, to drive the generator and produce electrical power. The operating speed can be, for example and without limitation, between 2,000-5,000 RPM. Alternatively, the rotor can be coupled to a longitudinal shaft such as shown in FIG. 4, and the shaft can rotate with the rotor relative to the stator and the turbine can rotate the longitudinal shaft that rotates the rotor. While the turbine is shown attached to the rotor in FIGS. 3 and 4, the turbine can be coupled indirectly to the rotor through one or more components that are attached to the rotor, so that when the turbine rotates the component(s), the component(s) rotates the rotor. Other drives beside the turbine can cause the rotor to rotate and the turbine is illustrative. Also, while drilling fluids are discussed throughout the disclosure, other fluids such as formation fluids, sea water, and other fluids are contemplated and are included herein.

The design permits a large airgap 46 between the stator 50 and rotor 54, such that the mud and grit can flow through relatively unobstructed. The airgap can also accommodate the thickness of sealing plates to provide additional protection for the generator parts. An airgap 46 between the stator and rotor is important for generating magnetic flux and the resulting power from the generator. A narrow airgap can produce more intense magnetic flux but a small gap is prone to clogging, if fluid through the airgap has contaminants such debris in mud. The invention creates a more focused, higher density (intensity) magnetic field in conjunction with a Halbach design of a magnet array for a given motor diameter and size of airgap in a similar comparison to any known radial flux generators and axial flux generators. The more intense magnetic flux allows a wider airgap that can still retain at least the same intensity as a small gap in other designs and thus allows debris to flow through the generator and particularly the motor. The flow through the generator and motor enables lubrication, cooling, and an energy source to drive the turbine 58 on the rotor 54 with a simplified mechanical assembly.

Figure 1B:
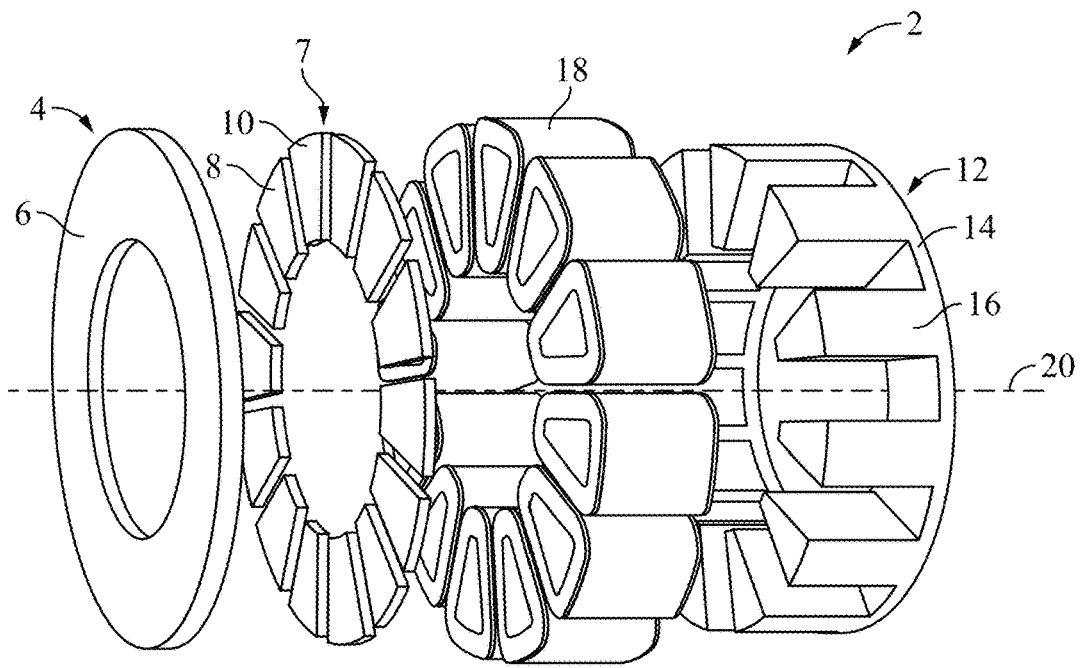
FIG. 1B is an assembly schematic view of a standard axial flux motor with a single rotor for an axial flux generator.

FIG. 4 is a schematic cross sectional view of another illustrated embodiment of an inventive mud flow-through, axial flux turbine generator with multiple rotors. The multi-rotor generator 40' is similar to the generator 40 of FIG. 3 and similar elements are labeled accordingly. This embodiment includes an axial flux motor 70' having two rotors 54A and 54B on both longitudinal ends of the stator 50. Both rotors are assembled such that the magnetic flux is focused towards the stator windings. (Other positions of the rotors and stators are contemplated.) The stator can include individual bobbins with wound coils, such as shown in FIG. 1B.

The rotors can be fixedly coupled together through a longitudinal shaft 60. The chassis 48 can provide a portion around with the shaft with the rotors can rotate with radial bearings 62 disposed therebetween. Thrust bearings 64 can be disposed between the rotor 54B and the downstream portion of the chassis 48 or in other suitable positions. Each rotor 54A and 54B can be coupled with a turbine 58A and 58B. Alternatively, a single turbine can be coupled to one of the rotors that drives both rotors. Further, the turbine can be coupled indirectly to the rotors such as being coupled to the longitudinal shaft that in turn is coupled to the rotors, so that when the turbine rotates the shaft, the shaft rotates the rotors.

Figure 5A:
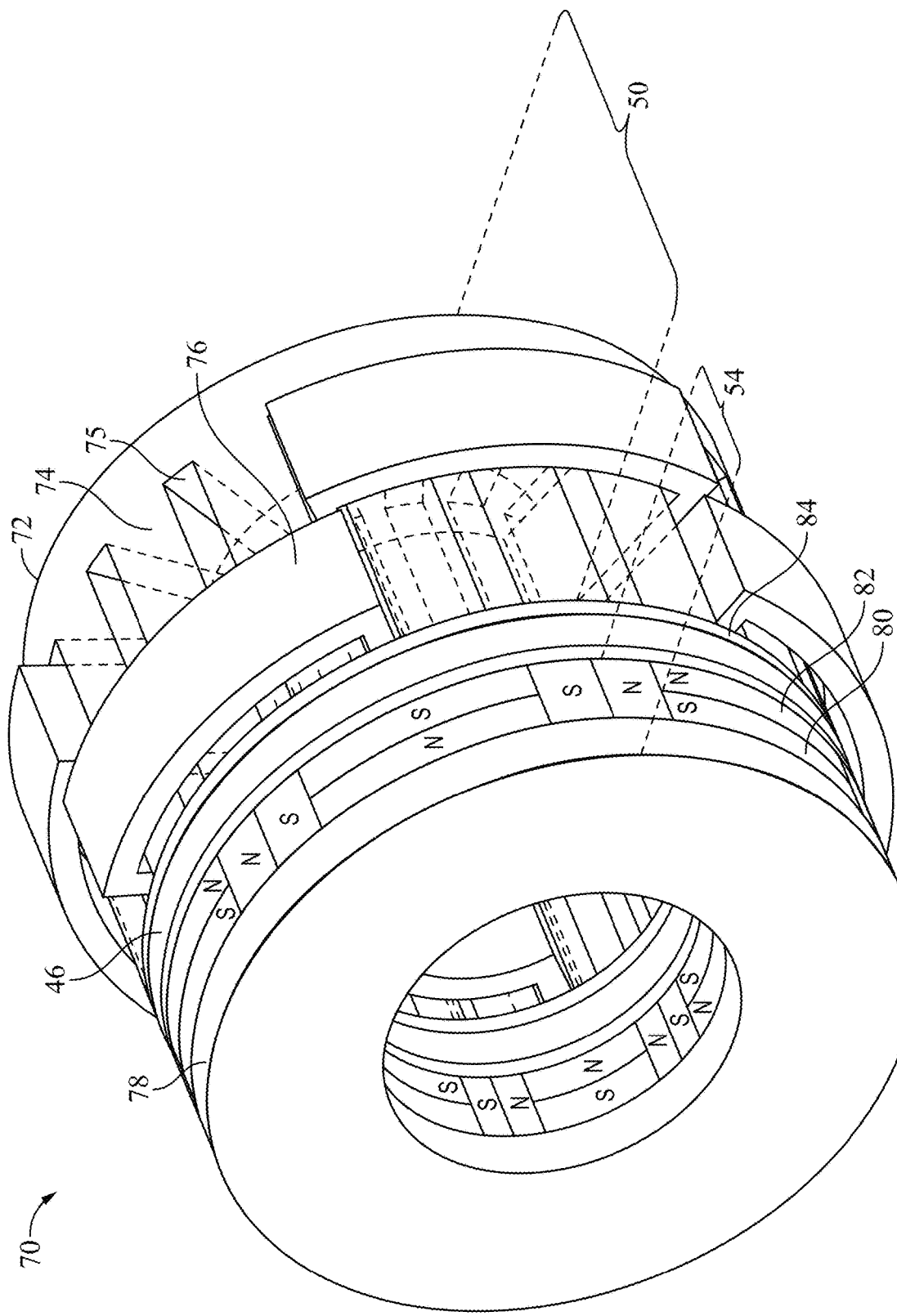
FIG. 5A is a schematic perspective view of an illustrative embodiment of principal parts of a Halbach axial flux motor of the generator of FIG. 3.

FIG. 5A is a schematic perspective view of an illustrative embodiment of principal parts of a Halbach axial flux motor of the generator of FIG. 3. While the axial flux motor 70 of the generator of FIG. 3 is specifically described in more details, but similar descriptions can be applied to the multi-rotor motor 70' of FIG. 4. The axial flux motor 70 includes the stator 50 and the rotor 54. The stator includes a stator core 72 and stator teeth 74 coupled with the stator core and extending in a longitudinal direction toward the rotor with openings 75 formed between adjacent teeth. The openings provide space for conductive stator windings 76 to be formed that are used to convert the magnetic flux into a voltage and current for power output from the generator. The rotor 54 includes a magnet array of magnets arranged to turn the magnetic flux without needing a magnetic rotor core 6 shown in a standard axial flux generator in FIGS. 1A-2A. In this arrangement of the magnets, the magnetic flux path creates less leakage and thus an airgap 46 that can be wider for the same flux density is possible. A support plate 78 can be used that can be nonmagnetic or magnetic if desired, because the magnet array can complete the circuit independent of a typical rotor core (back-iron). Also, in this embodiment, the wide airgap 46 can allow protection plates 82 and 84 for the rotor 54 and stator 50, respectively, to reduce wear from the mud flow with the debris. The protection plates are generally non-magnetic to not cause interference with the magnetic flux path between the stator and rotor.

Figure 5B:
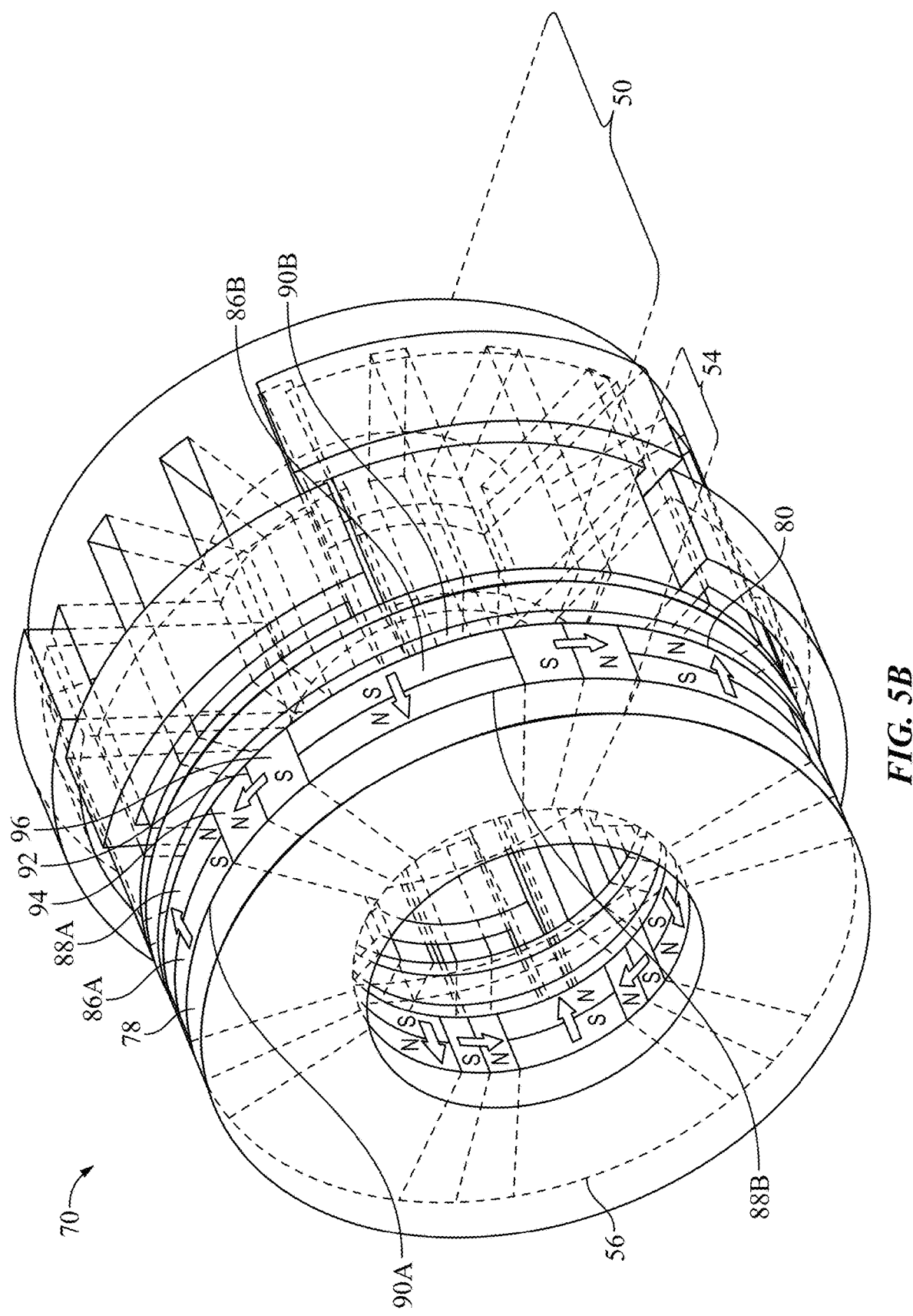
FIG. 5B is a schematic perspective view of a details of an illustrative Halbach magnet array of the axial flux motor of FIG. 5A.

FIG. 5B is a schematic perspective view of a details of an illustrative Halbach magnet array of the axial flux motor of FIG. 5A. The motor 70 includes the stator 50 and rotor 54. The rotor 54 includes a magnetic array 56 of permanent axial magnets 88 producing magnetic flux in an axial direction from an even number of alternating North and South magnetic poles. The magnetic array further includes circumferential magnets 92 disposed between the axial magnets 88 to turn the magnetic flux between the adjacent axial magnets, as shown in FIG. 10B below. In the illustrations, red is used for a North pole, and blue is used for a South pole. For example, the North pole 88A of axial magnet 86A faces the stator 50, and the South pole 90A of the axial magnet 86A faces away from the stator. Conversely, the North pole 88B of axial magnet 86B faces away from the stator 50, and the South pole 90B of the axial magnet 86B faces the stator. Arrows indicate magnetization direction of white for axial and yellow for circumferential. The magnets that form the poles are arranged in a Halbach array, such that the magnetic flux is returned within the magnetic array itself and therefore the conventional rotor core (back-iron) is unnecessary. However, a support plate 78 of magnetic or non-magnetic steel, aluminum, or alloy may be placed behind the magnets for additional structural support. If made of a magnetic material, a small increase in flux density can be realized, but in any case the support plate does not need to be axially as thick as a conventional magnetic rotor core (back-iron).

The Halbach magnet array fashion include a conventional N-S, alternating pole arrangement, but importantly with a space inserted between each principal magnet pole piece. The space is then filled with additional, interspaced magnets, whose magnetization is at right angles to the main pole magnets. This arrangement has the effect of turning the flux path within the magnet material, and therefore not requiring any conventional back-iron for this purpose. This arrangement also has the effect of containing and focusing the flux from the main pole pieces to reduce magnetic leakage, and therefore permitting a wider airgap for separation of the stator and rotor.

In at least one embodiment, magnetic widths can be determined from electromagnetic analysis of the design, but is nominally set at a 1:2 ratio for the width of inter-pole magnets to principal pole magnet width. For a 6-pole design (60 degrees), the principal pole magnets extend over a 40-degree span and the interspaced magnets, over a 20-degree span Analysis has shown that the Halbach magnet array performs better with larger airgaps than a conventional, simple, N-S magnet arrangement of similar magnet volume, due to reduced magnetic flux leakage from a more focused flux and higher flux density in the airgap. The design could therefore also be applied to a stator with a very thin winding that has no magnetic core within the winding space. The magnets themselves can be made of heat resistant material due to high ambient temperatures, such as Alnico, Samarium-Cobalt, or some grades of Neodymium-Iron-Boron.

The size can be determined by available space, desired output, and performance. An illustrative and non-limiting example of a cross sectional outside diameter of the generator suitable for downhole applications can be about 2 inches (5 cm), where the generator can have a 6-pole arrangement with a 3-phase winding.

Figure 6A:
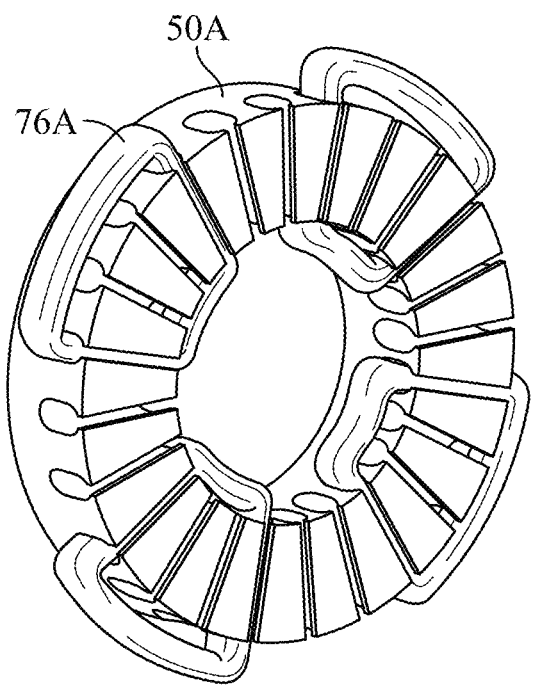
FIG. 6A is an illustrative schematic winding type as a one-layer lap winding utilizing a slotted stator core for the invention.
Figure 6B:
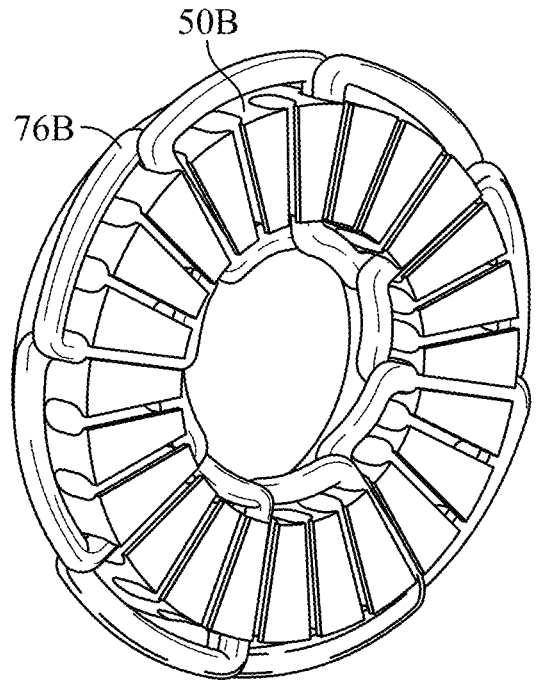
FIG. 6B is an illustrative schematic winding type as a two-layer lap winding utilizing a slotted stator core for the invention.
Figure 6C:
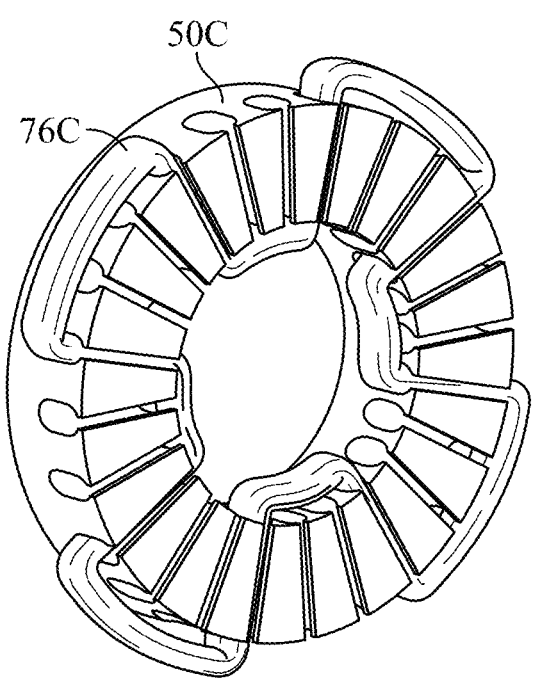
FIG. 6C is an illustrative schematic winding type as a one-layer wave winding utilizing a slotted stator core for the invention.
Figure 6D:
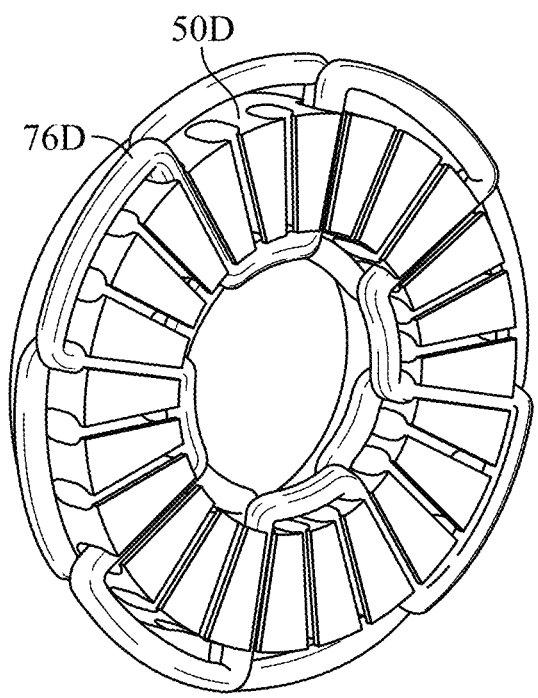
FIG. 6D is an illustrative schematic winding type as a two-layer wave winding utilizing a slotted stator core for the invention.

FIGS. 6A-6D show a schematic series of possible winding types utilizing a slotted core for the Halbach array. FIGS. 6A-6D show single phase winding for clarity. The empty slots show where the other two phases of windings may reside for a three-phase axial flux motor. FIG. 6A is an illustrative schematic winding type as a one-layer lap winding utilizing a slotted stator core for the invention. FIG. 6B is an illustrative schematic winding type as a two-layer lap winding utilizing a slotted stator core for the invention. FIG. 6C is an illustrative schematic winding type as a one-layer wave winding utilizing a slotted stator core for the invention. FIG. 6D is an illustrative schematic winding type as a two-layer wave winding utilizing a slotted stator core for the invention. In this embodiment, the stator comprises a magnetic core with coil windings of "magnet wire", which may be of copper or other suitable conductor material, such as aluminum. The windings may be formed as individual, lap-wound coils, such as one-layer lap windings 76A shown in FIG. 6A, or two-layer lap windings 76B shown in FIG. 6B. Alternatively, the windings may be formed by wave-winding of one or more layers, such as a one-layer wave winding shown in FIG. 6C, or a two layer wave winding shown in FIG. 6D. The coil span may be one pole-pitch or less (chorded or short-pitched).

Figure 7:
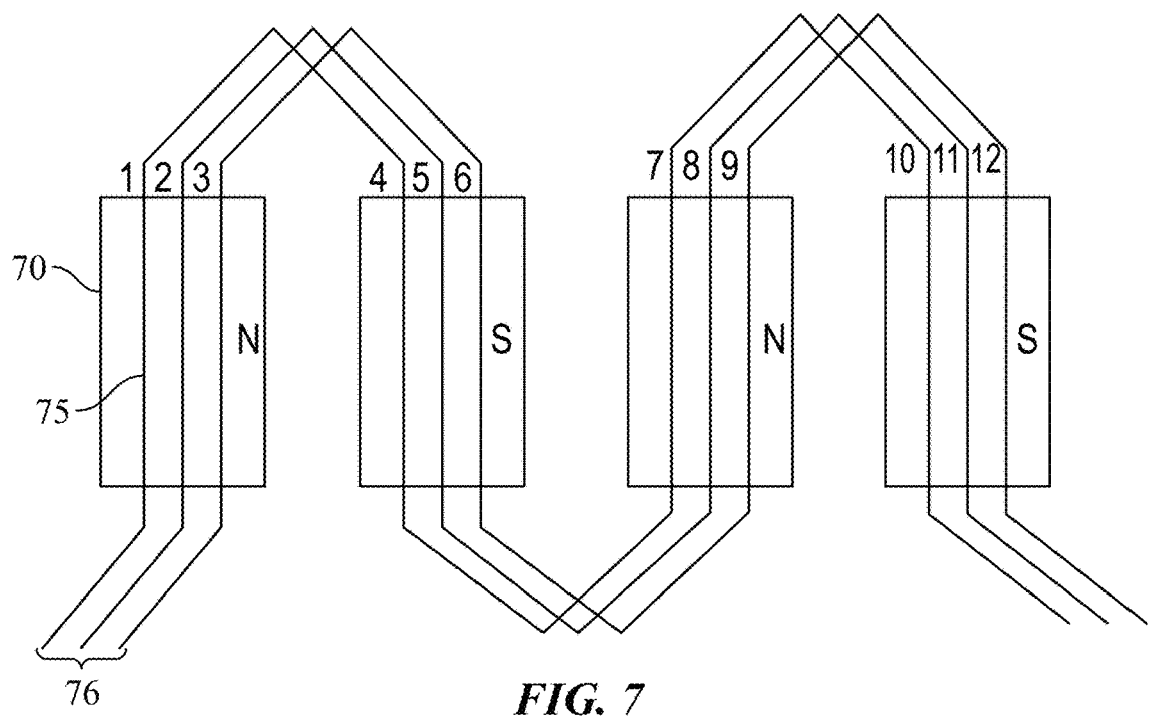
FIG. 7 is an illustrative schematic diagram of a three-phase wave winding for a slotted stator core.

FIG. 7 is an illustrative schematic diagram of a three-phase wave winding for a slotted stator core. In the schematic, only 12 of the 18 slots are illustrated. The winding can be arranged in a number of different ways and coil formations. A three-phase wave winding, such as shown, can be used with two coil wire bundles in each slot.

Figure 8A:
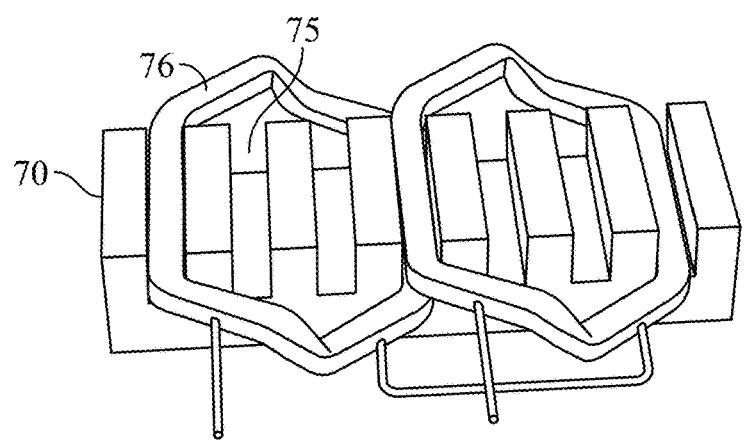
FIG. 8A is an illustrative pictorial diagrams of a single-phase winding for a slotted stator core.
Figure 8B:
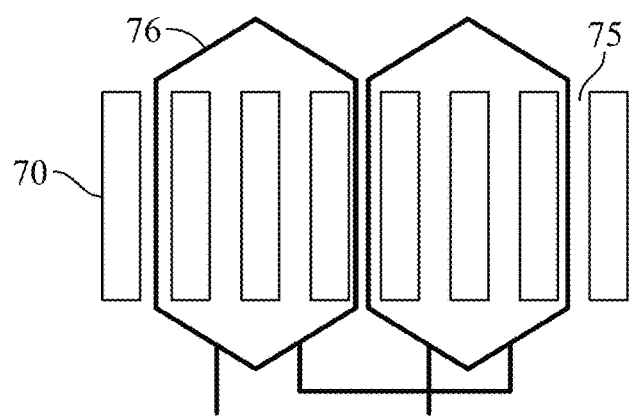
FIG. 8B is an illustrative schematic of the single-phase winding of FIG. 8A for a slotted stator core.

FIG. 8A is an illustrative pictorial diagrams of a single-phase winding for a slotted stator core. FIG. 8B is an illustrative schematic of the single-phase winding of FIG. 8A for a slotted stator core. FIG. 8A illustrates an alternative three-phase winding from the example of FIG. 7. The alternative can be formed with a lap winding having a two-layer winding arrangement to create bobbins with coils. In either the case of FIG. 7 or FIG. 8A or 8B, these embodiments are arranged as two layers, either stacked axially or side-by-side.

Figure 9:
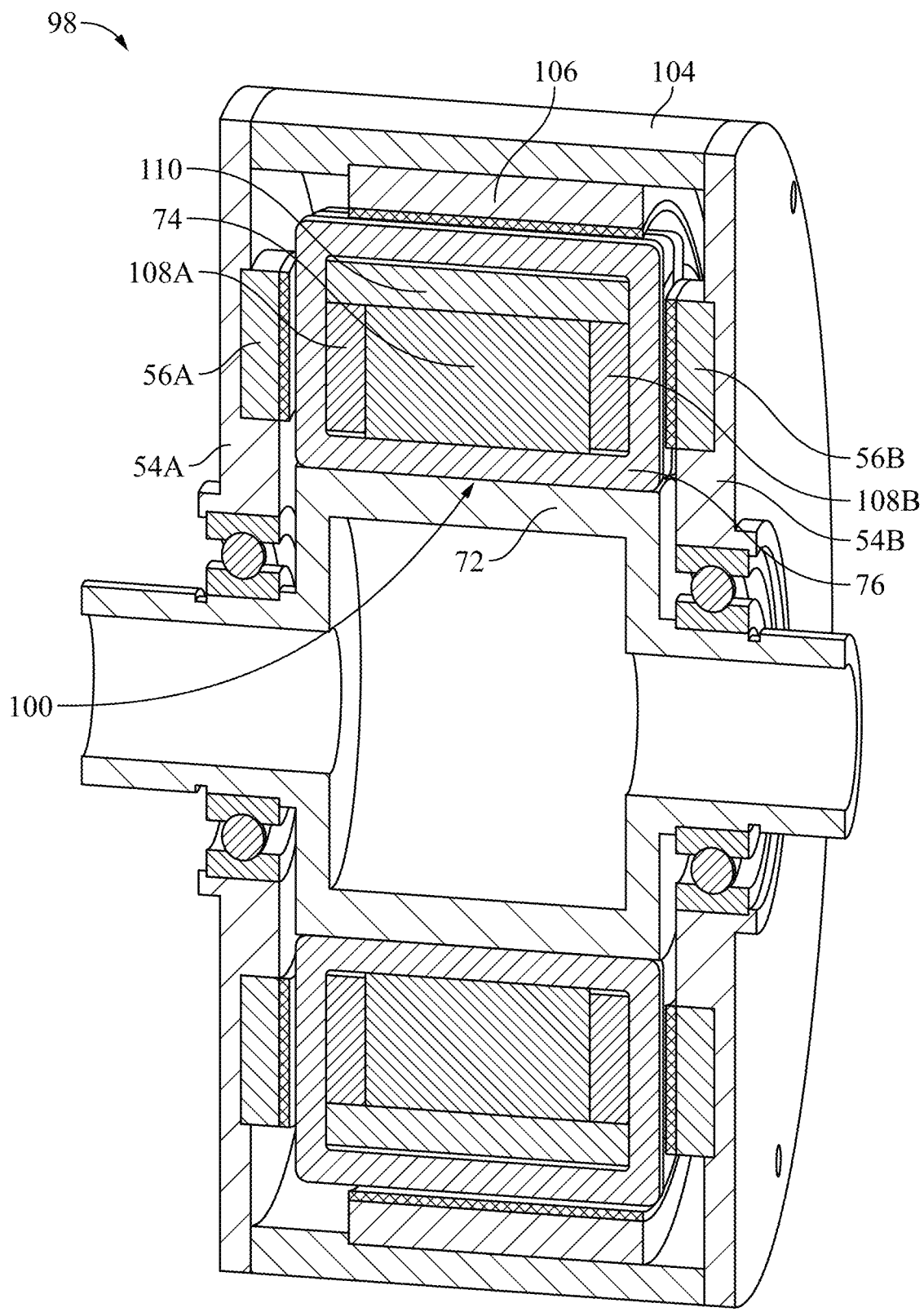
FIG. 9 is an illustrative schematic cross sectional view of another embodiment of an axial and radial flux generator of the invention.

FIG. 9 is an illustrative schematic cross sectional view of another embodiment of a hybrid axial and radial flux generator of the invention. The idea behind the embodiment described in FIG. 4 can be extended to include an additional radial flux rotor with a radial rotor magnet with radial flux that can rotate outside of the stator, where the stator has an inside diameter suitable for the radial flux rotor. In more detail, a hybrid axial and radial flux motor 98 can include a stator 100 and axial flux rotors 54A and 54B having axial magnet arrays 56A and 56B with axial magnets, respectively, and a radial flux rotor 104 having radial magnet array 106 with radial magnets. The magnet arrays can be arranged in a Halbach fashion, such as described herein with an example shown in FIG. 5B. The stator 100 includes a stator core 72 and stator teeth 74 to support stator windings 76. The stator can further include stator laminated portions 108A and 108B on sides of the stator core 72 to interface with the axial magnet arrays 56A and 56B, respectively. The flux rotor 104 with the magnet arrays, 56A, 56B, and 106 can rotate around the stator with the windings and interface with a corresponding stator laminated portion 110 coupled on the stator 100. The combination creates a hybrid, 3D-flux generator with axial flux components in combination with radial flux components. In at least some embodiments to accommodate the axial-flux radial-flux directions, the stator and rotor cores may be manufactured from either powder metallurgy or from more conventional laminated steels (laminations or powders required to reduce eddy-currents). The laminations preferably present as small-as-possible continuous areas at right angles to the direction of the magnetic flux.

Figure 10A:
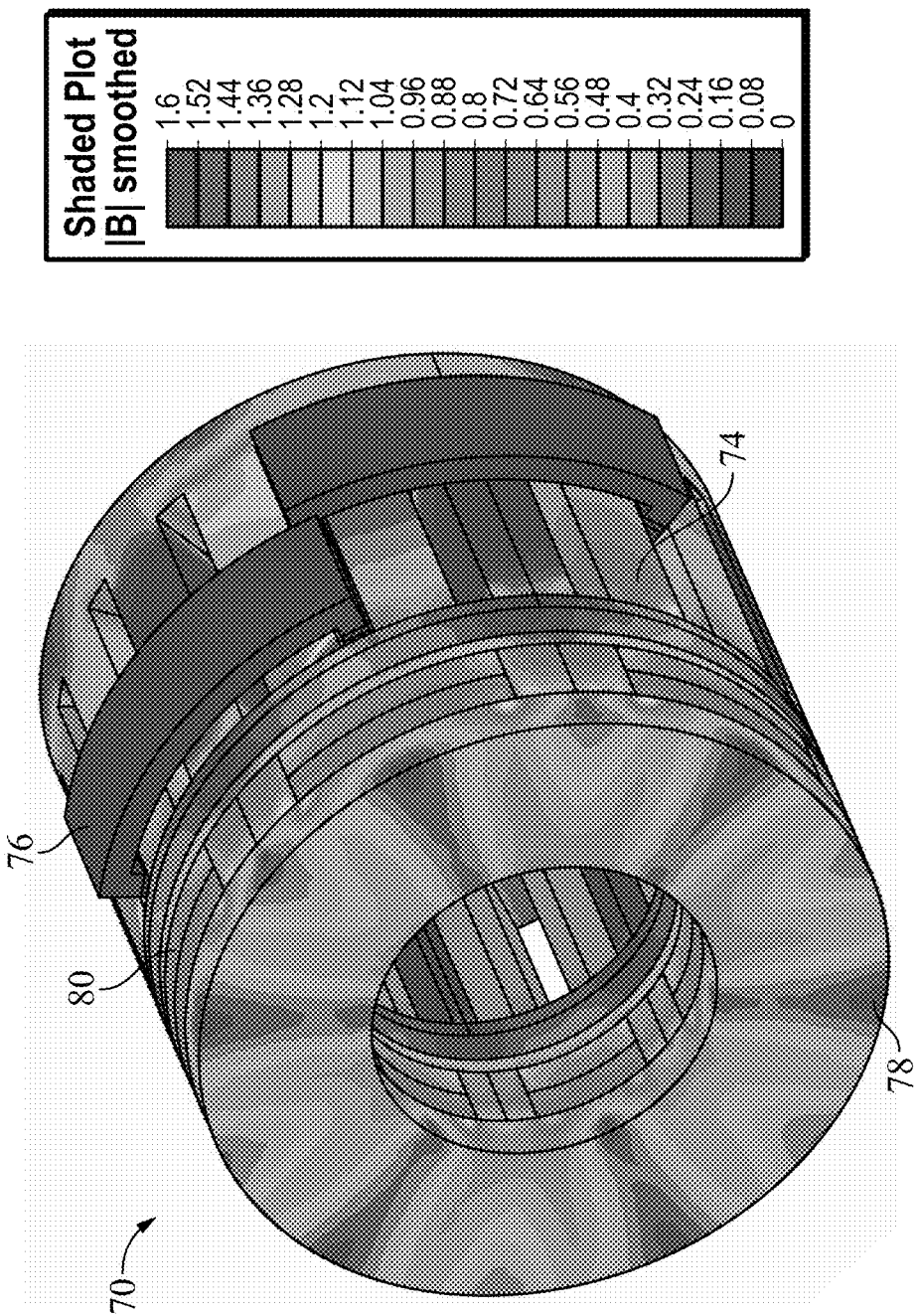
FIG. 10A is a three-dimensional model of the axial flux motor of FIG. 5A, showing flux density of the motor under a resistive load.
Figure 10B:
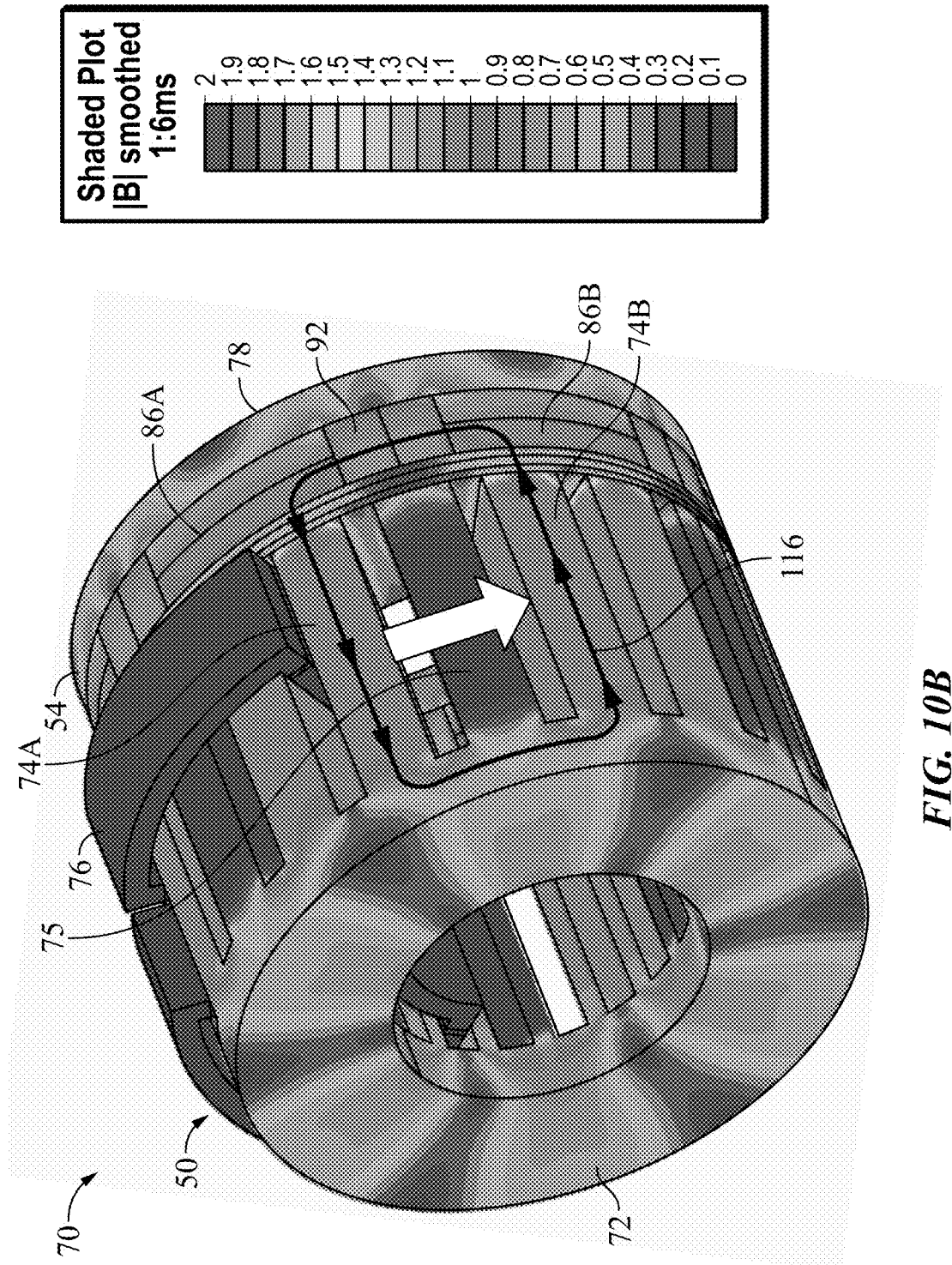
FIG. 10B is a three-dimensional model of the axial flux motor of FIG. 5A from an opposite direction of FIG. 10A, showing flux density of the motor and a flux path under a resistive load.

FIG. 10A is a three-dimensional model of the axial flux motor of FIG. 5A, showing flux density of the motor under a resistive load. FIG. 10B is a three-dimensional model of the axial flux motor of FIG. 5A from an opposite direction of FIG. 10A, showing flux density of the motor and a flux path under a resistive load. The high output mud-cooled axial flux motor 70 focuses the magnetic flux from the rotor toward the stator, that is, a majority of the magnetic flux flows in the direction from the rotor toward the stator. Further, the magnetic flux has less leakage than a standard axial flux system. The deep green in the rotor magnet array 80 and deep green in the stator teeth 74 shows the focused magnetic flux. In contrast, the support plate 78 has significantly less flux and in some portions almost no flux.

The magnetic flux path 116 shown in the reverse orientation of FIG. 10B illustrates the concepts. Referring the magnet orientations shown in FIG. 5B, the magnetic flux path travels into the axial magnet 86A in the rotor 54 with the North pole facing the stator 50 and travels across an airgap into the stator tooth 74A of the stator. At the end of the tooth, the magnetic flux path turns abruptly circumferentially within the magnetic stator core 72 into the stator tooth 74B. The magnetic flux path then travels along the stator tooth 74B and back across the airgap into the axial magnet 86B in the rotor 54 with the South pole facing the stator. The magnetic flux path then turns abruptly into the circumferential magnet 92 and then returns back into the axial magnet 86A. Little magnetic flux travels into the support plate 78, and very little if any leaks into the opening 75 between the stator teeth 74A and 74B.

Figure 11:
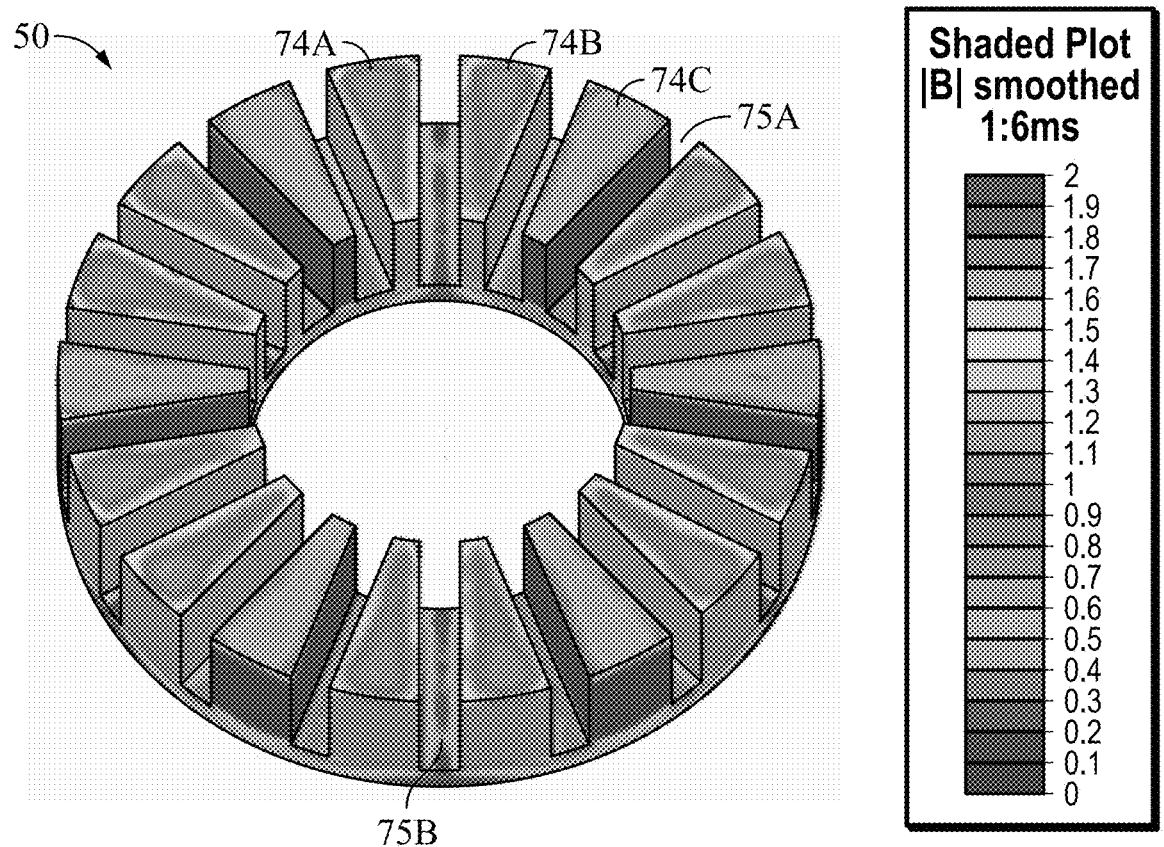
FIG. 11 is a three-dimensional model of the stator of FIG. 5A showing flux density of the stator teeth under a resistive load.

FIG. 11 is a three-dimensional model of the stator of FIG. 5A showing flux density of the stator teeth under a resistive load. Similarly to FIG. 10B, the magnetic flux is focused in the stator teeth 74A and 74B of the stator 50. The magnetic flux is not focused in the stator tooth 74C as it is not currently aligned with the appropriate magnets in the rotor (not shown) in this plot. Further, the opening 75A adjacent the tooth 74C and even the opening 75B between green teeth show little or no magnetic flux leakage.

Figure 2A:
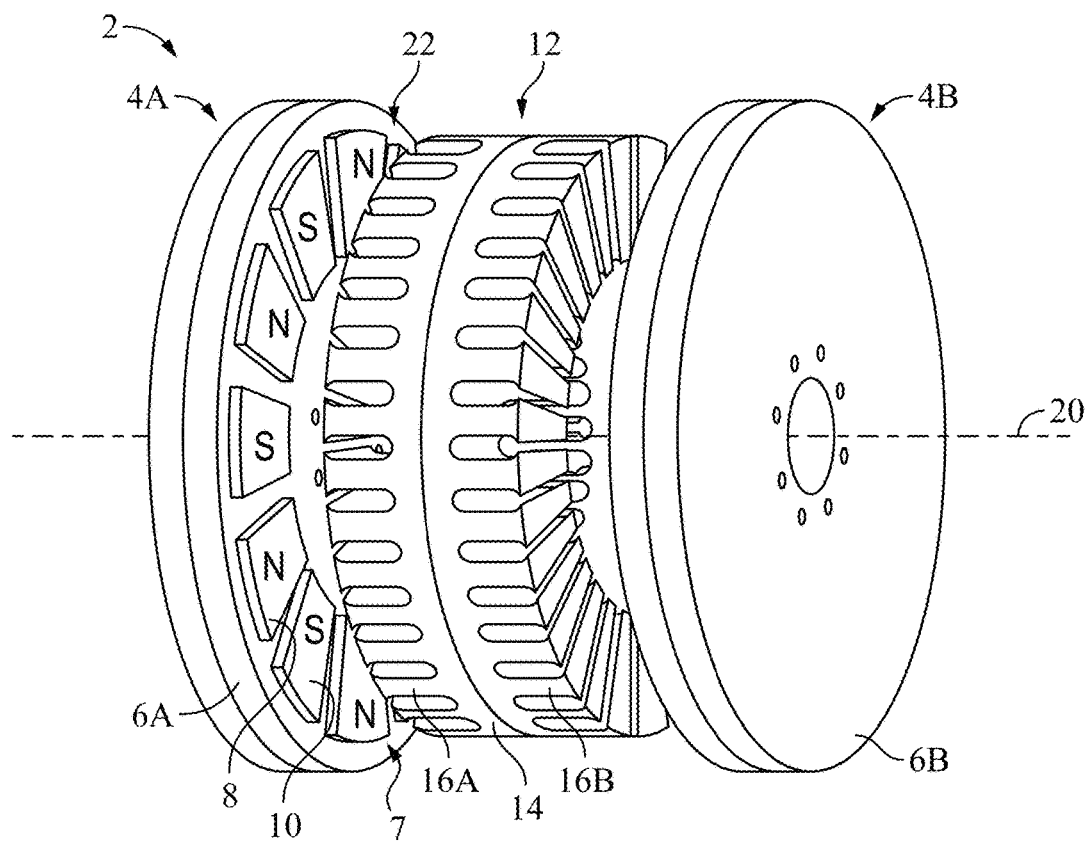
FIG. 2A is a schematic perspective view of a standard axial flux motor with multiple rotors for an axial flux generator.
Figure 2B:
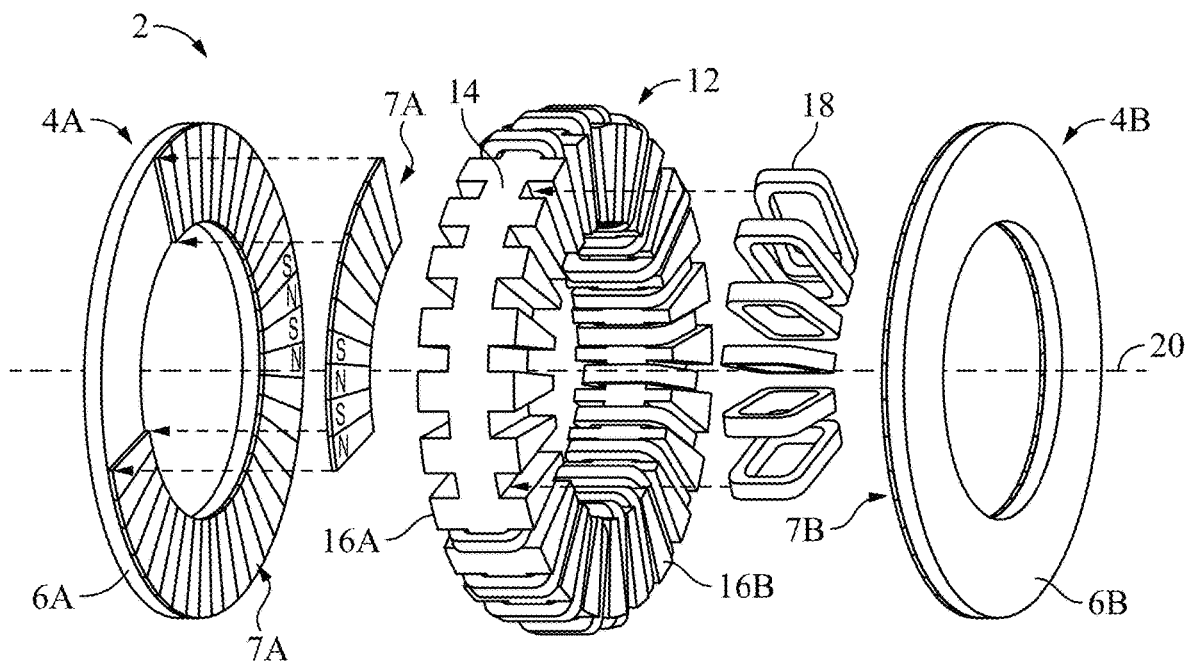
FIG. 2B is an assembly schematic view of a standard axial flux motor with multiple rotors for an axial flux generator.

FIG. 12A is a two-dimensional diagram of a magnet array of a model of a standard axial flux motor with a standard magnet array with two rotors having magnetic support plates, such as in FIG. 2B. The model 112 shows a stack of ambient air 114, a magnetic support plate 116 inward from the ambient air, a standard magnet array 118 inward from the support plate, and an adjacent airgap 120 inward from the standard magnet array. Similarly, the model 112 shows, from an opposite direction, a stack of ambient air 114', a magnetic support plate 116' inward from the ambient air, a standard magnet array 118' inward from the support plate and adjacent to the airgap 120.

FIG. 12B is a two-dimensional diagram of a magnet array of a model of an illustrative high output axial flux motor of the invention with a Halbach magnet array with two rotors having either magnetic or non-magnetic support plates, such as in FIG. 4. The model 122 shows a stack of ambient air 114, a non-magnetic support plate 124 inward from the ambient air, a Halbach magnet array 126 inward from the support plate, and an adjacent airgap 120 inward from the Halbach magnet array. Similarly, the model 122 shows, from an opposite direction, a stack of ambient air 114', a non-magnetic support plate 124' inward from the ambient air, a Halbach magnet array 126' inward from the support plate and adjacent to the airgap 120.

The following plots and graphs provide exemplary results in a comparison of a Halbach magnetic arrangement with a standard arrangement. The shaded colors in the plots represent the magnitude of the flux density in the direction parallel to y-axis. The y-axis direction is the direction that cuts the airgap and is relevant for generating EMF voltage in the stator. The overlaid contour lines show the full direction of magnetic flux and, by their spacing, give an indication of the flux density as well.

Figure 12C:
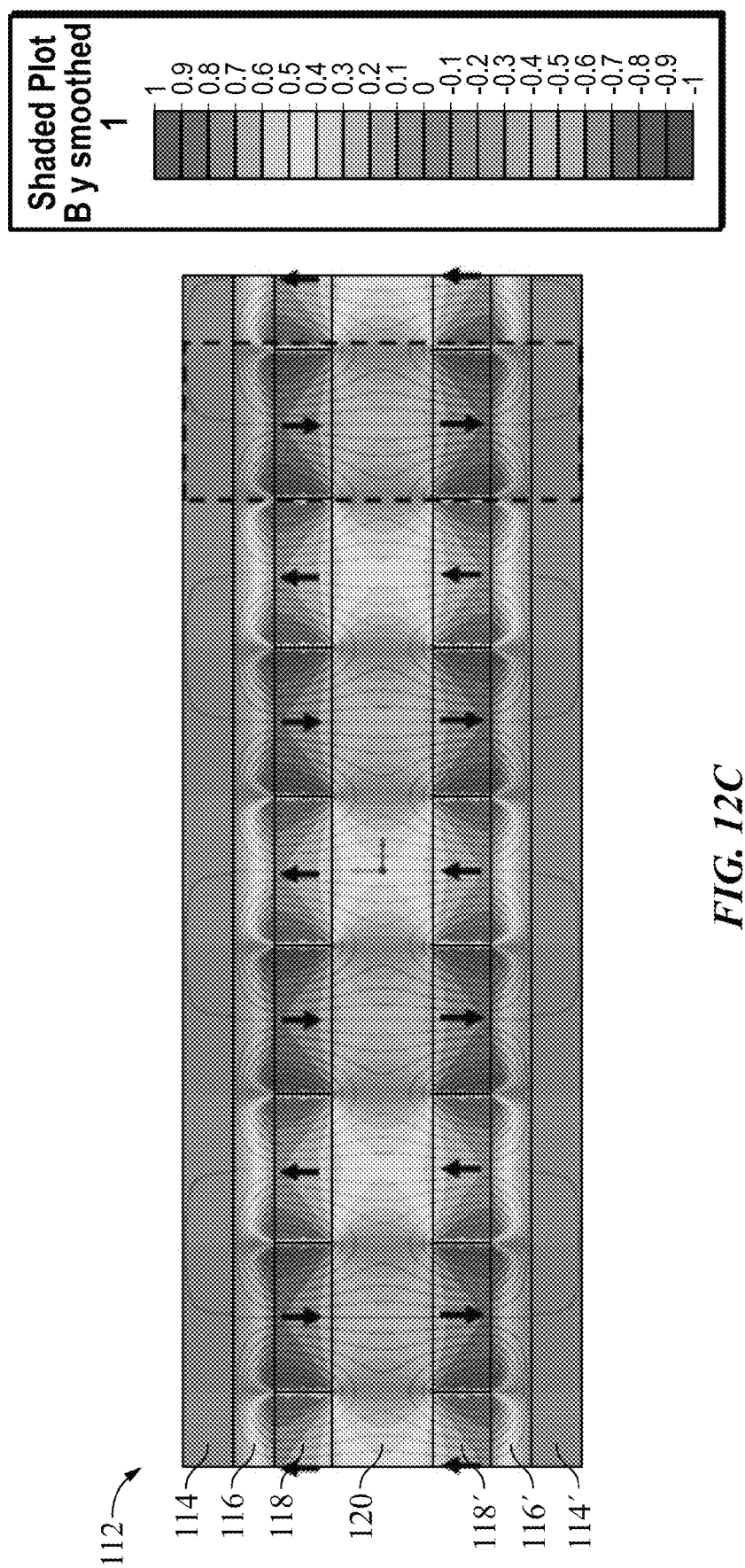
FIG. 12C is an illustrative two-dimensional flux density plot in a y-direction for the model of FIG. 12A having a standard magnet array with two rotors having magnetic support plates.
Figure 12C:
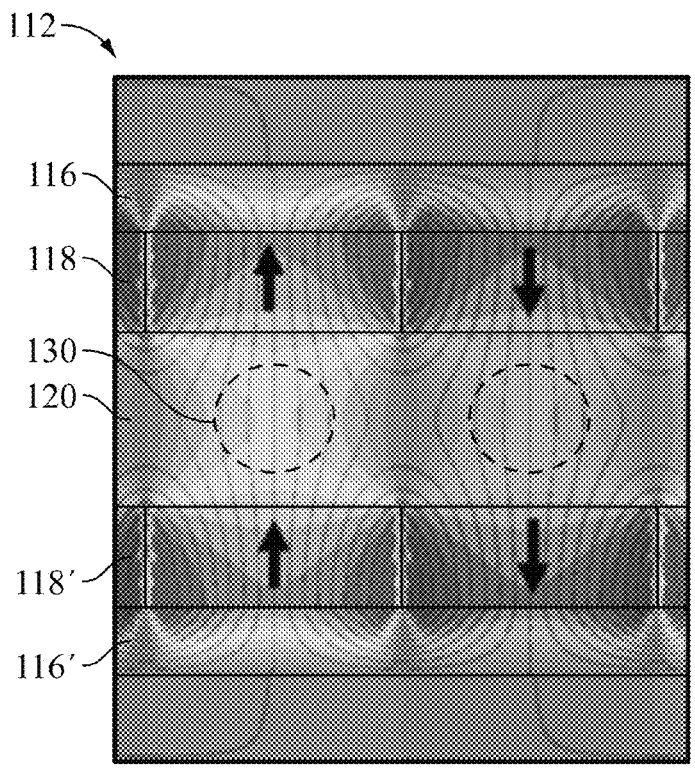
Figure 12C:
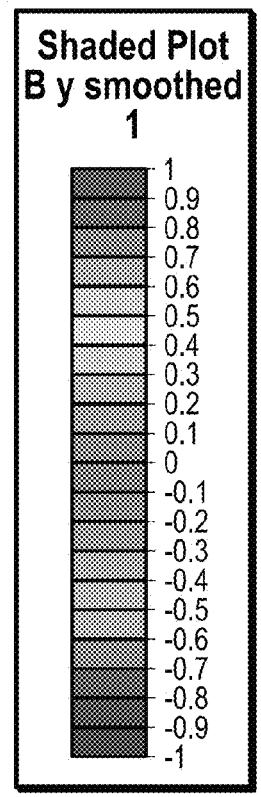

FIG. 12C is an illustrative two-dimensional flux density plot in a y-direction for the model of FIG. 12A having a standard magnet array with two rotors having magnetic support plates. FIG. 12C' is an enlarged portion of the two-dimensional flux density plot of FIG. 12C. The arrows show the magnetic flux directions in the magnets. The arrows are axial only. In the standard array model, the flux from adjacent magnets is returned within the magnetic support plates ("back-iron") to turn the flux, because the magnets themselves lack the capability by being only axially oriented North and South poles. The flux density in the airgap 120 is indicated in the spacing of the lines. The circled area 130 in FIG. 12C' shows a representative width of high flux density.

Figure 12D:
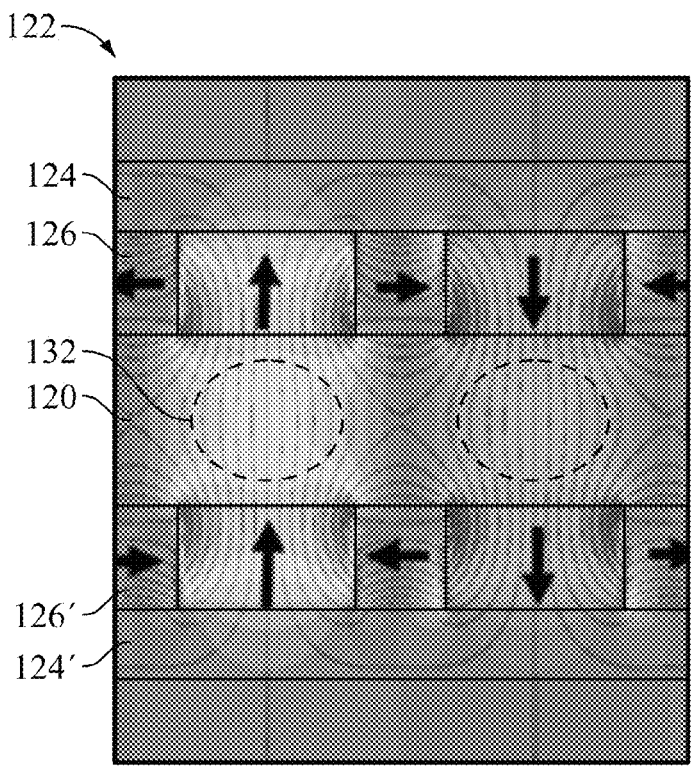
FIG. 12D is an illustrative two-dimensional flux density plot in a y-direction for the model of FIG. 12B having a Halbach magnet array with two rotors and non-magnetic support plates.
Figure 12D:
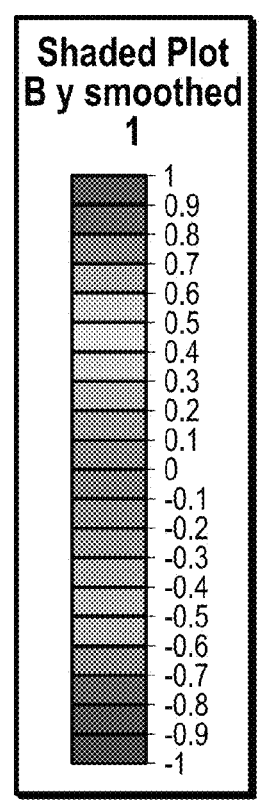
Figure 12D:
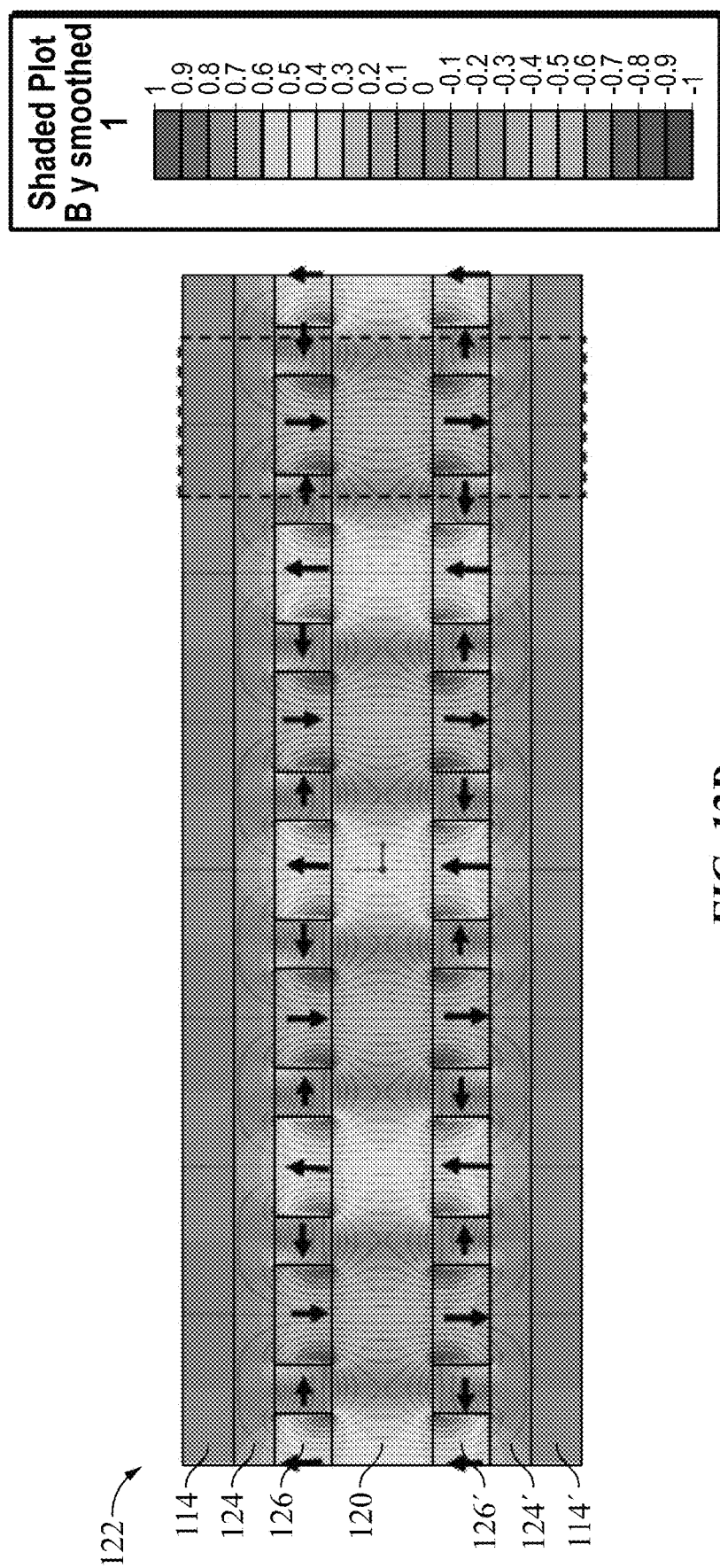

FIG. 12D is an illustrative two-dimensional flux density plot in a y-direction for the model of FIG. 12B having a Halbach magnet array with two rotors and non-magnetic support plates. FIG. 12D' is an enlarged portion of the two-dimensional flux density plot of FIG. 12D. In the Halbach magnet array, the magnetic flux is mostly returned within the magnets, with minimal leakage outside the area, particularly with the non-magnetic magnets. The arrows show the magnetic flux directions that include axial directions and also lateral directions in the two-dimensional model (circumferential directions in an actual embodiment). The flux can be returned without requiring the magnetic support plates because the Halbach magnetic array includes magnets aligned to turn sideways between the axially oriented North and South poles magnets. The result is that a more powerful magnetic flux is created in the airgap 120 where the power is created in coil positioned between the sets of magnet arrays. The circled area 132 in FIG. 12D' shows a representative width of high flux density that is wider than the circled area 130 of FIG. 12C'.

Figure 12E:
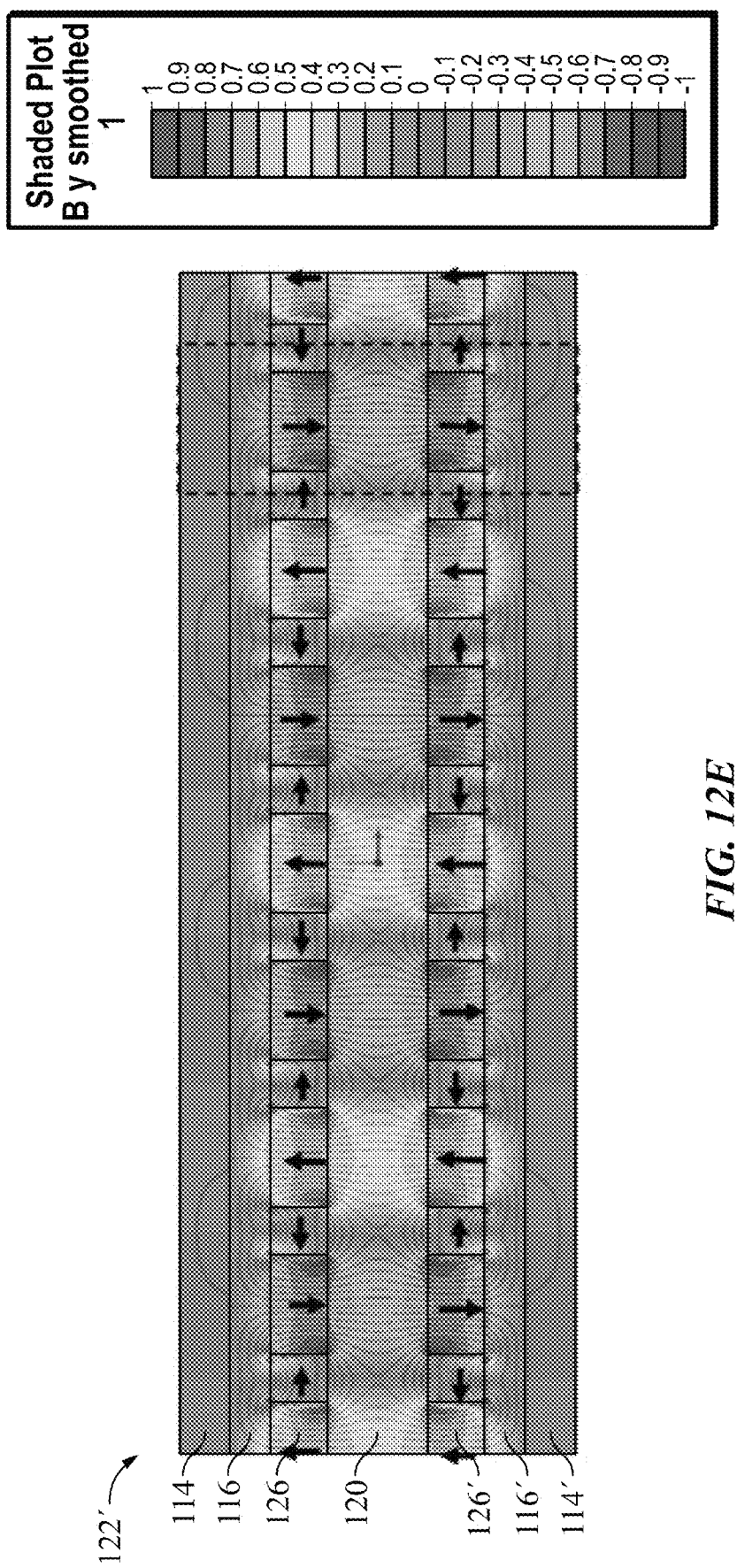
FIG. 12E is an illustrative two-dimensional flux density plot in a y-direction for the model of FIG. 12B having a Halbach magnet array with two rotors and magnetic support plates.
Figure 12E:
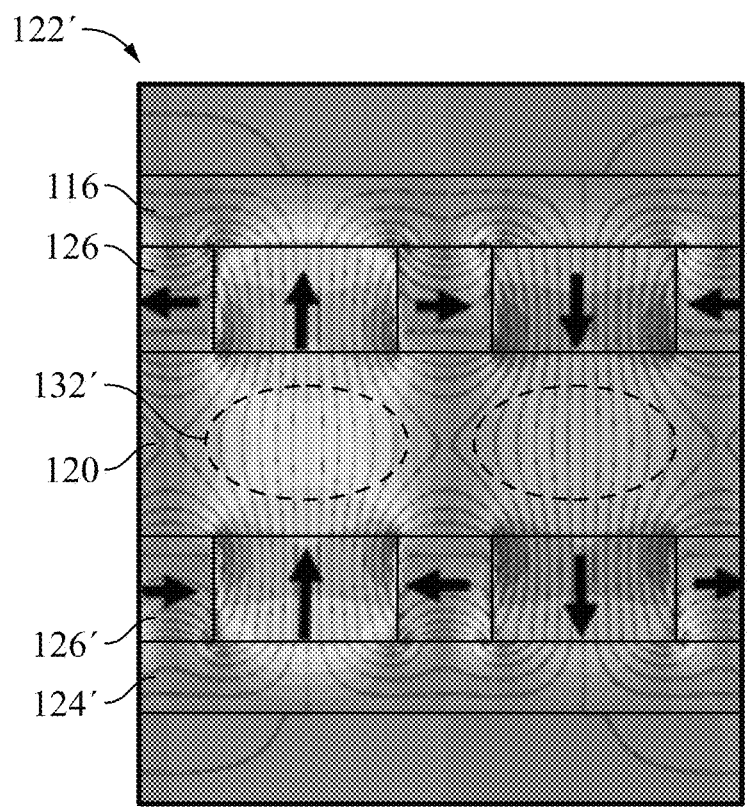
Figure 12E:
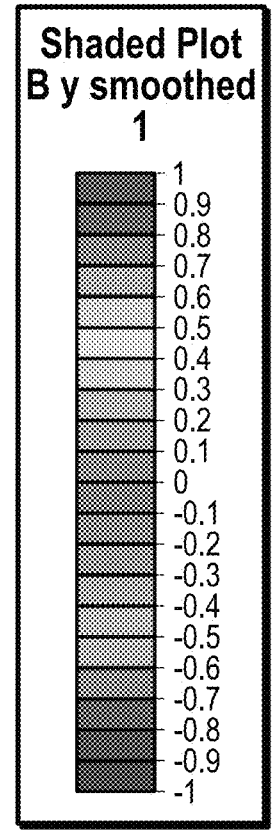

FIG. 12E is an illustrative two-dimensional flux density plot in a y-direction for the model of FIG. 12B having a Halbach magnet array with two rotors and magnetic support plates. FIG. 12E' is an enlarged portion of the two-dimensional flux density plot of FIG. 12E. FIG. 12E and FIG. 12E' with the magnetic support plate shows similar results as in FIG. 12D and FIG. 12D' with the non-magnetic support plate. However, the flux is returned both within the magnets, and also within the magnetic support plate. The magnetic support plate can provide an additional, high magnetic-permeability path that can serve to increase an overall flux reaching the airgap 120 by about 10% in at least some modeled embodiments. Because the magnets primarily turn the magnetic flux, the material of the support plate has some but small influence on the magnetic flux. The circled area 132' in FIG. 12E' shows a representative width of high flux density that is even wider than the circled area 132 in FIG. 12D' and significantly more wider than the circled area 130 of FIG. 12C'.

While the standard array may seem better with larger areas of blue and red in the magnet regions, the Halbach array produces flux with an x-axis component that is not visible in the above images. Therefore, the magnetic flux that crosses the airgap in the y-direction that is in the region where the coil windings are located is a point of interest.

Figure 12F:
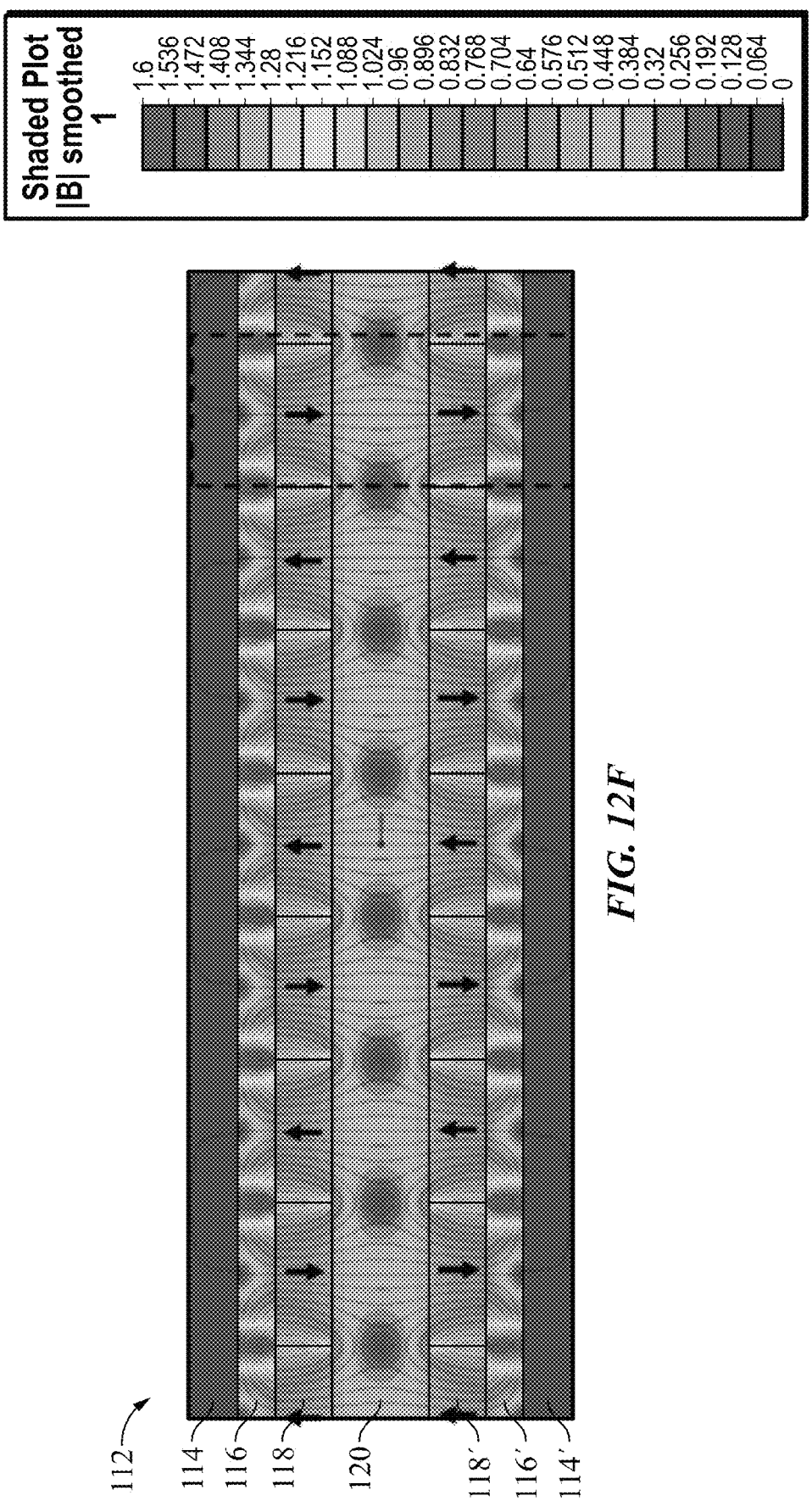
FIG. 12F is an illustrative two-dimensional flux density plot of flux density components in x-directions and y-directions for the model shown in FIG. 12A of a standard axial flux motor with a standard magnet array with two rotors having magnetic support plates.
Figure 12G:
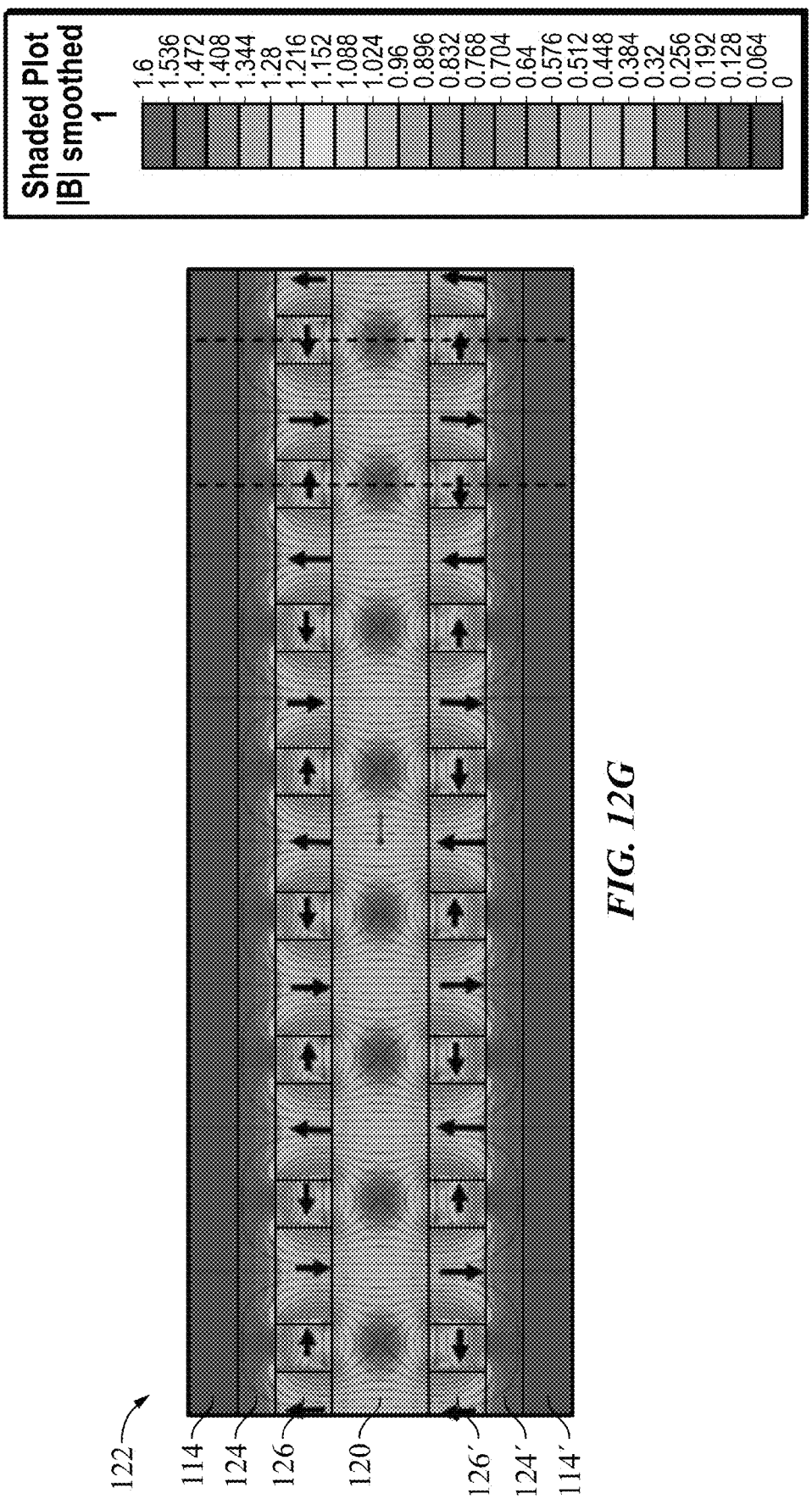
FIG. 12G is an illustrative two-dimensional flux density plot of flux density components in x-directions and y-directions for the model shown in FIG. 12B of a high output axial flux motor of the invention with a Halbach magnet array with two rotors having non-magnetic support plates.

FIG. 12F is an illustrative two-dimensional flux density plot of flux density components in x-directions and y-directions for the model shown in FIG. 12A of a standard axial flux motor with a standard magnet array with two rotors having magnetic support plates. FIG. 12G is an illustrative two-dimensional flux density plot of flux density components in x-directions and y-directions for the model shown in FIG. 12B of a high output axial flux motor of the invention with a Halbach magnet array with two rotors having non-magnetic support plates. The structures are the same as described in FIG. 12A for model 112 and FIG. 12B for model 122 and therefore would show a similar magnetic flux in the y-direction of FIGS. 12C and 12D, respectively. The difference is that FIGS. 12F and 12G are plotted with a magnitude of flux density that considers both x-axis and y-axis components of the flux density. These figures show the comparative concentration of the flux density in the important airgap 120 in the Halbach magnet array with the non-magnetic embodiment. FIG. 12F shows a high magnetic flux in the support plates (back-iron) 116 and 116' of the magnetic material, but is distal from the airgap 120. FIG. 12G shows little flux density in the non-magnetic support plates 124 and 124'. FIG. 12G also shows a higher flux density in the Halbach magnet arrays 126 and 126' compared to the standard magnet arrays 118 and 118' of FIG. 12F.

Figure 12H:
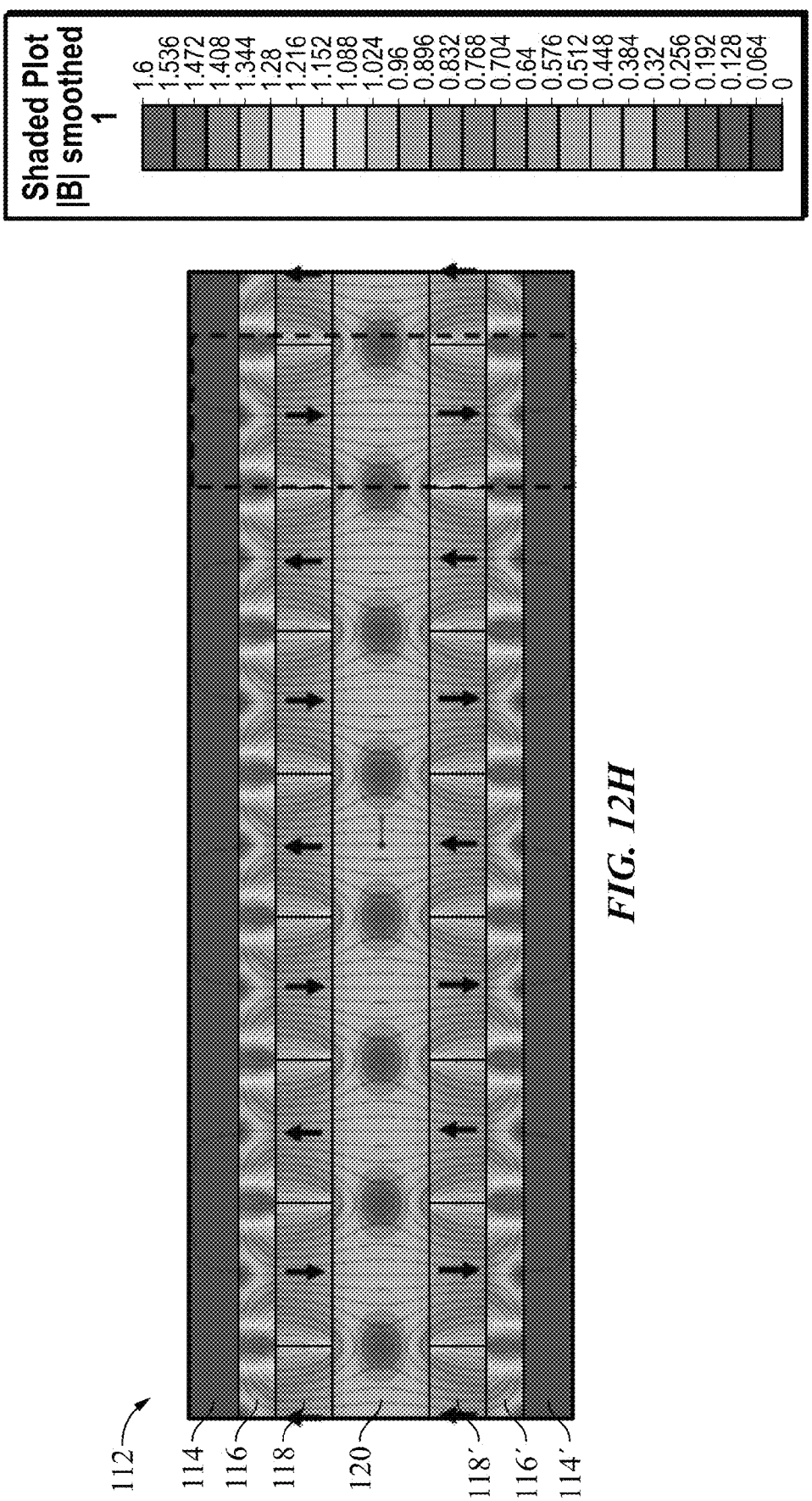
FIG. 12H is a duplicate of FIG. 12F to juxtapose results of the model for a standard axial flux motor with the results of the model of FIG. 12I below.
Figure 12I:
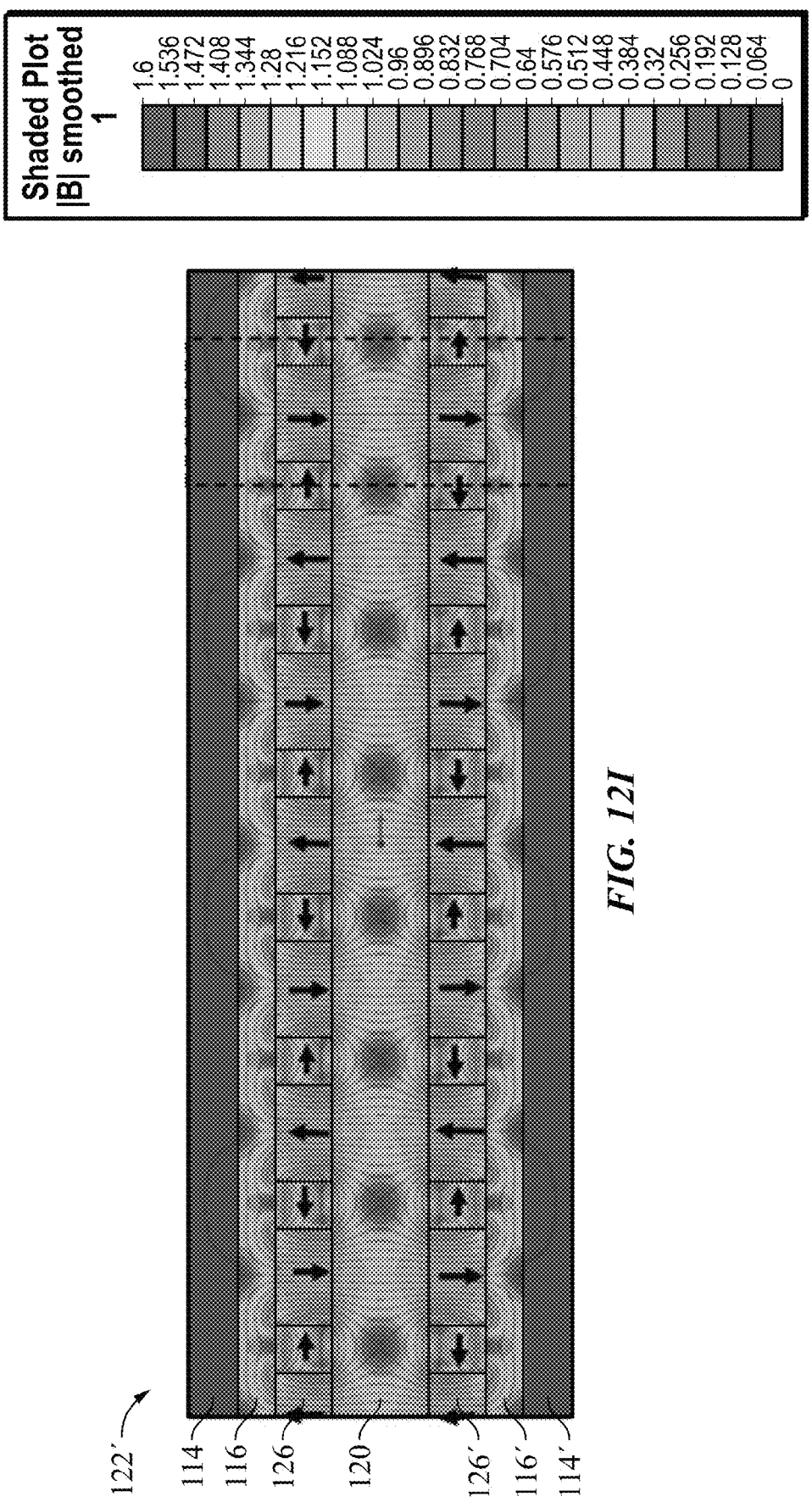
FIG. 12I is an illustrative two-dimensional flux density plot of flux density components in x-directions and y-directions for the model shown in FIG. 12B of a high output axial flux motor of the invention with a Halbach magnet array with two rotors having magnetic support plates.

FIG. 12H is a duplicate of FIG. 12F to juxtapose results of the model for a standard axial flux motor with a magnetic rotor core and stator core of FIG. 12F with the results of FIG. 12I below. FIG. 12I is an illustrative two-dimensional flux density plot of flux density components in x-directions and y-directions for the model shown in FIG. 12B of a high output axial flux motor of the invention with a Halbach magnet array with two rotors having magnetic support plates. FIG. 12H shows the high concentration of the magnetic flux in the support plates (back-iron) 116 and 116' of the magnetic material for turning the magnetic flux path, but is distal from the airgap 120. FIG. 12I shows a higher flux density in the magnetic support plates 116 and 116' compared to the flux density of non-magnetic support plates 124 and 124' of FIG. 12G. FIG. 12I also shows a higher flux density in the Halbach magnet arrays 126 and 126' compared to the flux density of standard magnet array 118 and 118' of the standard axial flux motor of FIG. 12H.

Figure 13:
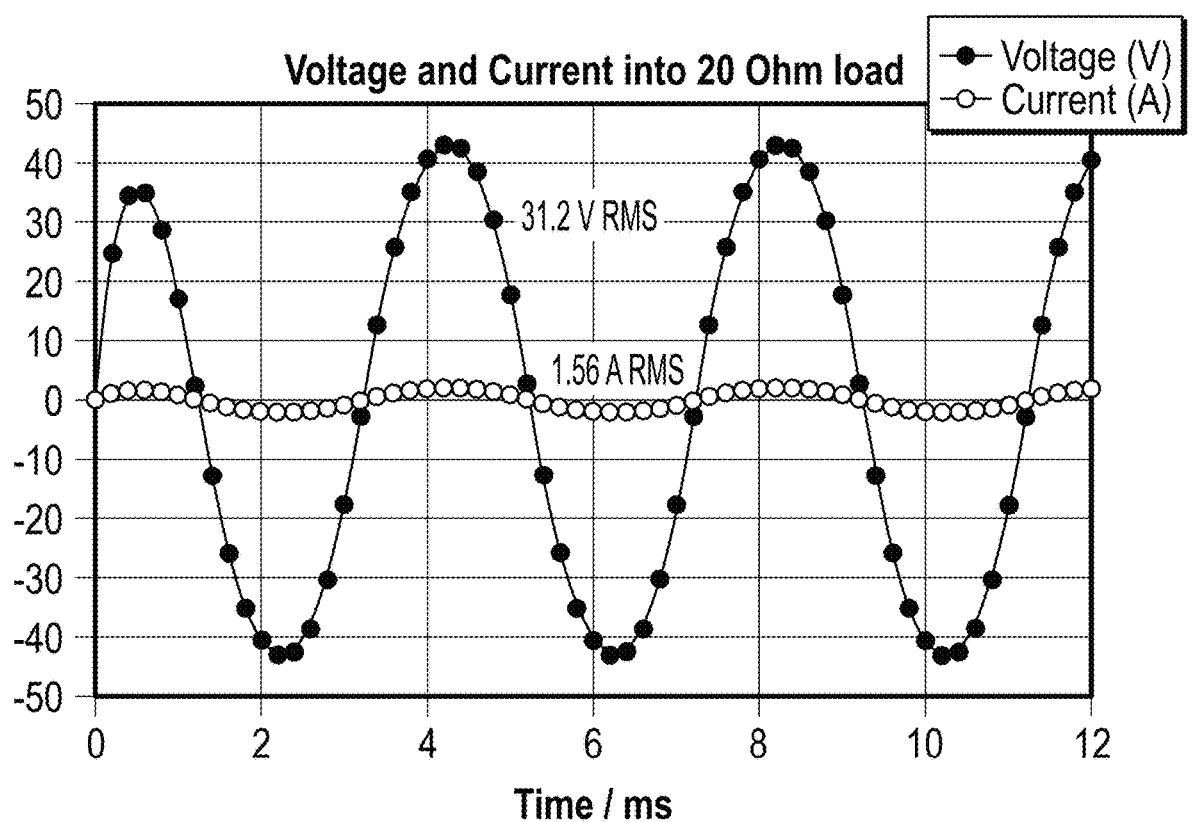
FIG. 13 is a schematic chart of voltage and current versus time for an illustrative resistive load.

FIG. 13 is a schematic chart of voltage and current versus time for an illustrative resistive load. The voltage and current are provided to a 20 Ohm load, resulting in an RMS voltage of about 31 volts and power of about 49 watts (per phase) at a rotational speed of 5,000 RPM.

Figure 14:
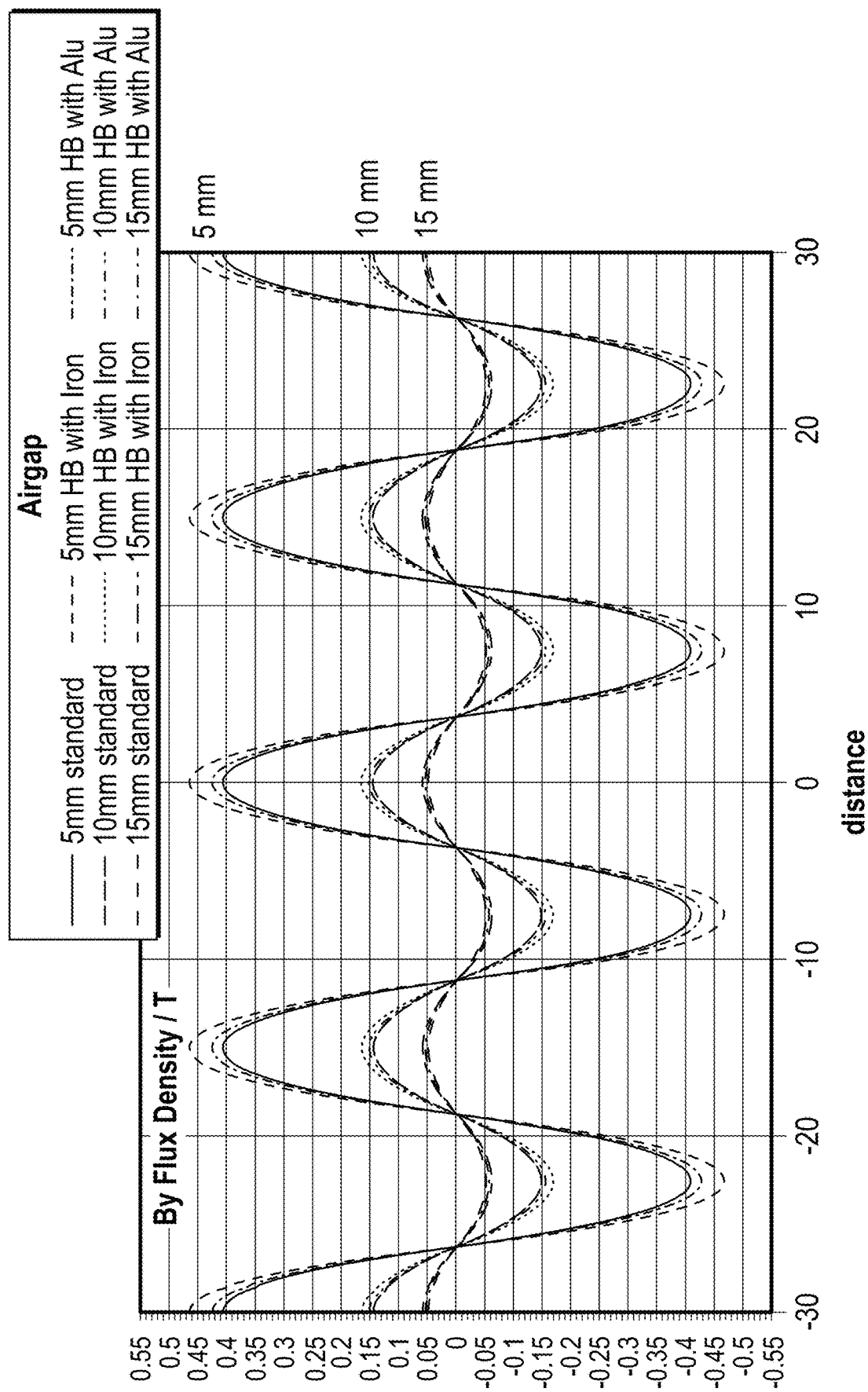
FIG. 14 is a schematic chart of flux density versus angle of rotation for a standard generator with a magnetic rotor support plate, an invention generator with a Halbach axial flux motor and a magnetic support plate, and an invention generator with a Halbach axial flux motor and a non-magnetic support plate, each having different gap widths of 5 mm, 10 mm, and 15 mm.

FIG. 14 is a schematic chart of flux density versus angle of rotation for a standard generator with a magnetic rotor support plate, an invention generator with a Halbach axial flux motor and a magnetic support plate, and an invention generator with a Halbach axial flux motor and a non-magnetic support plate, each having different gap widths of 5 mm, 10 mm, and 15 mm. The Halbach magnet array described herein shows the improved relative performance for each airgap and particularly for the 5 mm airgap. Advantageously, the generator has a flux density of at least 0.4 Tesla ("T").

Figure 15:
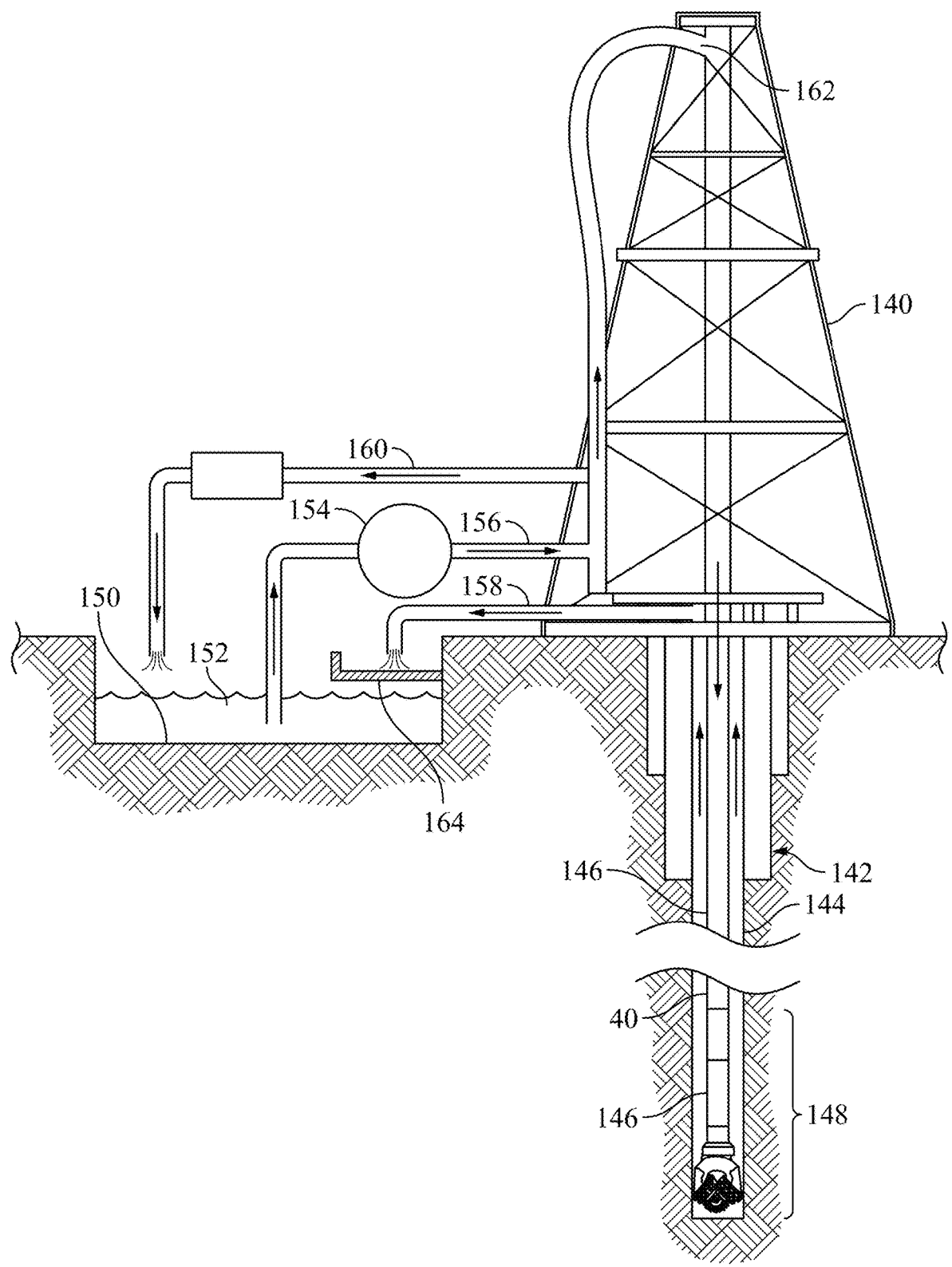
FIG. 15 is a schematic of a drilling rig in a well drilling operation with the mud flow-through, axial flux turbine generator installed downhole in a drill string to generate electrical power for downhole equipment.

FIG. 15 is a schematic of a drilling rig in a well drilling operation with the mud flow-through, axial flux turbine generator installed downhole in a drill string to generate electrical power for downhole equipment. The axial flux turbine generator 40 can be used in various places in an oil field environment. In some embodiments, the axial flux turbine generator 40 can be used downhole to power equipment. For example, an oil rig 140 generally is used to drill a hydrocarbon well 142 to establish a wellbore 144. A drill string 146 of pipe and tooling is progressively inserted into the wellbore as drill bits progressively deepen the wellbore. Downhole equipment, such as a bottom hole assembly (BHA) 148, includes instrumentation for measuring and guiding the well operation, generally based on signals from the equipment sent uphole to a surface processor that can provide processed information to a drilling operator. The axial flux turbine generator can be fluidicly coupled to the drill string and the mud flowing through the drill string uphole relative to the BHA. A mud pump 154 pumps drilling fluid with debris as mud 152 from a mud pit 150 through an inlet conduit 156 to an inlet to the drill string 146 to travel downward through the drill string and through the axial flux turbine generator 40 and the BHA with a drill bit to help flush cuttings from the drill bit.

Referring to FIGS. 3 and 4, the mud can flow through the annulus 44 and through the airgap 46. The mud flow can force the turbine 58 to rotate, which causes the axial flux rotor 54 to rotate. The rotating rotor with the magnet array creates a magnetic flux that the coils convert into electricity to power the equipment, as described above. T In FIG. 15, the mud pressure causes the mud to return up an annulus between the larger wellbore and the small drill string to the surface and into a return conduit 158. The mud flows over a screen 164 to separate larger particles and returns to the mud pit 150. A bypass conduit 160 is fluidicly coupled to the inlet conduit 156.

Having provided the above discussion and principles of the invention, the following includes further details on specific components of at least one illustrative embodiment of the generator.

Stator Core

For durability in the intended oil and gas, down-hole application, the stator core can be manufactured from a roll of soft magnetic steel (also known as "electrical steel"), in which slots are added by post-machining. The material is commercially available in a range of thicknesses and grades, which are chosen based on intended operating speed/frequency and manufacturing practicalities according to the physical size of the machine. This process forms a laminated stator core that reduces eddy-current losses. The optimal slot and tooth widths can be determined through electromagnetic analysis.

Number of Slots

The core can be slotted according to the required number of poles and phases in the generator. For example, if 6 poles and 3 phases are chosen for an embodiment, then 18 slots can be a sensible arrangement.

Depth of Slot

The depth of the slot generally can be determined by the required number of turns to be accommodated. The remaining annular stator section, below the slot, has the function of linking and returning the magnetic flux back to the rotor. The thickness of the remaining annular stator section can be determined by the operating flux levels and acceptable flux density.

Slot Liner

A suitable material, such as Nomex-Kapton-Nomex (NKN), can be added as a liner to the slots to protect the coil windings that are disposed in the slots. The liner protects against physical damage from sharp edges and is also an electrical insulator.

Winding

A coil winding can formed to be disposed within the slots. For the intended high-temperature application, a polyimide enamel coating on the wire of NEMA "Heavy Build" specification is preferred. This type of wire can operate at temperatures up to 220 degrees C./430 degrees F. with some grades reaching 260 degrees C./500 degrees F. The wire gauge is chosen according to the required number of turns, as determined by consideration of the machine's design and operating speed, which in turn determines the voltage, and further by consideration of the operating current.

Potting/Encapsulation

For protection, the stator and winding assembly can be encapsulated in a suitable epoxy resin. This material also improves thermal transfer from the stator winding. At an illustrative size suitable for downhole applications, the generator outside diameter can be about 2" and a 6-pole arrangement with a 3-phase winding can be accommodated.

Stator Winding Connections

The stator winding exit-leads need to be appropriately supported and terminated.

Number of Poles

The number of poles are generally an even number and will impact the electrical output frequency of the machine at any given operating speed. The physical size of the machine will influence how many poles can comfortably and practically be accommodated on the rotor, since the magnet pieces become proportionally smaller with the greater number of poles. The size also influences the slot configuration of the stator and hence the slot-width for the winding.

At this nominal 2" (50 mm) diameter, a 6-pole configuration is practical with 12 individual magnet poles.

Magnet Material

The magnet material advantageously can be suitable for a high-temperature environment. A number of materials are possible, and for the oil field downhole application, Samarium Cobalt can be used, which has grades capable up to 350 degrees C. (660 degrees F.). Another options is Alnico magnets for high temperature.

Support Plate

The arrangement of magnets in a Halbach array is intrinsically unstable, with the resulting magnetic forces tending to prefer a different alignment of the magnets. Hence, the magnets generally require bonding to each other to maintain the formation, or preferably mounting and bonding to a support plate. As mentioned, this support plate does not need to be magnetic, since the Halbach array reverses the flux within the magnet assembly and hence does not require a magnetic back-iron or keeper plate for the purpose. However, a magnetic support plate will marginally assist in the reversal of flux and provide marginally better performance than, for example, a non-magnetic aluminum plate.

Shaft

A suitable shaft arrangement, which may form part of the downhole tool, is used with the rotor.

One or more key features alone or in combinations, in at least one embodiment can include:

Only need a single rotor to function;
Single rotor is easily dismountable;
Use of a Halbach permanent-magnet array that creates a more focused, axial magnetic field, with less magnetic leakage, compared to a regular arrangement, and permits using a wider airgap;
A relatively large airgap, which facilitates mud-flow through the machine and reduces likelihood of blockage;
No soft magnetic "back-iron" is required for the rotor for flux return (although some structural support may be advantageous);
Rolled, laminated stator construction to reduce eddy-current losses (powder metallurgy an alternative option)
2-layer winding for compactness.
3-phase winding as opposed to single-phase.
The windings can be other than interconnected, single bobbin (lap-type) windings, and can include, for example, a 3-phase, 2-layer continuous, wave winding;
The 3-phase winding can utilize wye-delta switching for a 1:√3 voltage control, or a wave-winding on the single stator can be wound in two halves, also permitting a 1:2 voltage control;
Generator can be built with a coreless (air-core) winding;
Epoxy-resin-potted/encapsulated winding; and
High grade materials to extend operating range to higher temperatures.

While the axial flux turbine generator has been described in various embodiments, the generator is not limited to such embodiments or application. Different windings, different combinations of axial flux and radial flux embodiments, different numbers of poles and different pole pitches, different allocations of North and South poles, and other variations are contemplated for the invention. Further, the generator can be equipped with sensors coupled to processors and other devices for actuating, controlling, measuring, or other operational functions, as would be known to those with ordinary skill in the art given the teachings herein.

Other and further embodiments utilizing one or more aspects of the inventions described above can be devised without departing from the disclosed invention as defined in the claims. For example, some of the components could be arranged in different locations, and other variations that are limited only by the scope of the claims.

The invention has been described in the context of preferred and other embodiments, and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope of the following claims.

What is claimed is:

1. An axial flux generator having a longitudinal axis of rotation for components of the generator, comprising:
a housing forming an interior volume;
a chassis configured to support the components in the interior volume with a longitudinal shaft aligned with the longitudinal axis and disposed at least partially in the interior volume; and
an axial flux motor coupled to the longitudinal shaft of the chassis, comprising:
an axial flux stator having a stator core with metallic windings coupled to the stator core; and
an axial flux rotor coupled to the longitudinal shaft and at least partially spaced longitudinally from the axial flux stator, the axial flux rotor being configured to rotate around the longitudinal axis relative to the axial flux stator, the axial flux rotor having a magnet array comprising:
a plurality of axial magnets having alternating North and South poles that are coupled in a circumferential array around the longitudinal axis, wherein magnetic fields generated between the North and South poles of the axial magnets are in a direction parallel with the longitudinal axis; and
a plurality of circumferential magnets having North and South poles circumferentially located between the axial magnets in the circumferential array, wherein magnetic fields generated between the North and South poles of the circumferential magnets are in a direction circumferentially around the longitudinal axis,
the magnet array of the axial flux rotor being longitudinally spaced by an airgap from the metallic windings of the axial flux stator, and a resulting magnetic flux from the magnet array being focused axially towards the metallic windings, and
the interior volume between the housing and the chassis coupled with the axial flux motor forming an annulus, the annulus configured to allow fluids with debris to flow through the annulus and flow at least partially through the airgap between the axial flux stator and the axial flux rotor.

2. The axial flux generator of claim 1, further comprising a support plate for the magnet array.

3. The axial flux generator of claim 1, further comprising a turbine coupled to the axial flux rotor and configured to rotate the axial flux rotor with the fluids in the annulus around the longitudinal axis.

4. The axial flux generator of claim 1, further comprising a turbine coupled to the longitudinal shaft and the axial flux rotor coupled to the longitudinal shaft, the turbine being configured to rotate the longitudinal shaft with the fluids in the annulus around the longitudinal axis.

5. The axial flux generator of claim 1, further comprising at least one of a non-magnetic support plate and magnetic support plate coupled to the magnet array.

6. The axial flux generator of claim 1, wherein the axial flux rotor and axial flux stator are configured to function independent of a rotor support plate of ferro-magnetic material.

7. The axial flux generator of claim 1, wherein the generator comprises a single axial flux rotor and a single axial flux stator.

8. The axial flux generator of claim 1, wherein the generator comprises a plurality of axial flux rotors and a single axial flux stator and wherein at least a first axial flux rotor is longitudinally coupled adjacent to the axial flux stator and at least a second axial flux rotor is longitudinally coupled adjacent to the axial flux stator distally from the first axial flux rotor relative to the axial flux stator.

9. The axial flux generator of claim 1, wherein the axial flux stator is formed with a core and the core is manufactured from at least one of coiled electrical steel, powder metallurgy, and soft magnetic composite configured to reduce eddy current losses compared to a core not manufactured from the coiled electrical steel, powder metallurgy, or soft magnetic composite.

10. The axial flux generator of claim 1, wherein axial flux stator is wired for three-phase electrical generation.

11. The axial flux generator of claim 1, further comprising at least one non-magnetic protection plate coupled to at least one of the axial flux stator and axial flux rotor and longitudinally positioned adjacent the longitudinal airgap.

12. The axial flux generator of claim 1, wherein the fluids comprise at least one of drilling fluids, downhole formation fluids, or sea water.

13. A method of creating electrical energy at a subsurface location for subsurface equipment in a wellbore, comprising:
    placing the axial flux generator of claim 1 at a location in the wellbore below a ground surface;
    circulating fluids in the wellbore through the annulus to rotate the axial flux rotor relative to the axial flux stator;
    generating a rotating magnetic flux in the axial flux rotor extending into the axial flux stator;
    generating electrical energy; and
    providing the electrical energy to the downhole equipment.

14. The method of claim 13, further comprising a turbine coupled to the axial flux rotor, and wherein the circulating fluids in the wellbore through the annulus to rotate the axial flux rotor comprises rotating the turbine with the fluids to rotate the axial flux rotor.

15. The method of claim 13, further comprising a turbine coupled to the longitudinal shaft and the axial flux rotor coupled to the longitudinal shaft, and wherein the circulating fluids in the wellbore through the annulus to rotate the axial flux rotor comprises rotating the turbine with the fluids to rotate the longitudinal shaft to rotate the axial flux rotor.

16. The method of claim 13, wherein the fluids comprise at least one of drilling fluids, downhole formation fluids, or sea water.

* * * * *